(12) United States Patent
Cheng et al.

(10) Patent No.: US 12,306,905 B2
(45) Date of Patent: May 20, 2025

(54) DATA COLLECTION METHOD AND DEVICE

(71) Applicant: Huawei Technologies Co., Ltd., Shenzhen (CN)

(72) Inventors: Jian Cheng, Nanjing (CN); Liang Zhang, Nanjing (CN); Li Xue, Nanjing (CN); Haonan Ye, Nanjing (CN); Weiwang Xu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/153,255

(22) Filed: Jan. 11, 2023

(65) Prior Publication Data

US 2023/0142028 A1    May 11, 2023

Related U.S. Application Data

(63) Continuation of application No. PCT/CN2021/105576, filed on Jul. 9, 2021.

(30) Foreign Application Priority Data

Jul. 12, 2020  (CN) .......................... 202010665910.7

(51) Int. Cl.
*H04L 43/02*     (2022.01)
*G06F 17/40*     (2006.01)

(52) U.S. Cl.
CPC ............. *G06F 17/40* (2013.01); *H04L 43/02* (2013.01)

(58) Field of Classification Search
None
See application file for complete search history.

(56) References Cited

U.S. PATENT DOCUMENTS

| | | | |
|---|---|---|---|
| 9,749,888 B1* | 8/2017 | Colwell | H04W 24/04 |
| 11,018,974 B1* | 5/2021 | Ferdowsi | H04L 41/0654 |
| 11,290,537 B1* | 3/2022 | Argenti | H04L 41/0853 |
| 2002/0183972 A1 | 12/2002 | Enck et al. | |
| 2014/0215056 A1 | 7/2014 | Malakhova et al. | |
| 2014/0258474 A1* | 9/2014 | Kim | H04W 4/70 709/219 |
| 2014/0280388 A1* | 9/2014 | Fox | G06F 16/13 707/812 |

(Continued)

FOREIGN PATENT DOCUMENTS

| | | |
|---|---|---|
| CN | 104702680 A | 6/2015 |
| CN | 105607724 A | 5/2016 |

(Continued)

OTHER PUBLICATIONS

Wang, Z. et al., "Adaptive Subscription to Yang Notification, draft-wang-netconf-adaptive-subscription-00," NETCONF Working Group, Internet-Draft, Intended status: Standards Track, Expires: Sep. 4, 2020, Mar. 3, 2020, 25 pages.

*Primary Examiner* — Joshua Joo
(74) *Attorney, Agent, or Firm* — SLATER MATSIL, LLP

(57) ABSTRACT

This application provides a data collection method and a device. A data collection device determines, based on a threshold corresponding to a target indicator, a collection interval for to-be-collected data of the target indicator from a plurality of available collection intervals; and the data collection device collects the data of the target indicator based on the collection interval.

20 Claims, 15 Drawing Sheets

(56) References Cited

U.S. PATENT DOCUMENTS

| | | | | |
|---|---|---|---|---|
| 2014/0310407 | A1* | 10/2014 | Zhang | G06F 11/3096 709/224 |
| 2015/0046512 | A1* | 2/2015 | Ashby | H04L 43/08 709/203 |
| 2016/0094401 | A1* | 3/2016 | Anwar | G06F 11/3006 709/223 |
| 2016/0205219 | A1 | 7/2016 | Wang et al. | |
| 2017/0052831 | A1* | 2/2017 | Wu | G06F 11/3476 |
| 2017/0222866 | A1* | 8/2017 | Wang | H04L 67/12 |
| 2019/0138678 | A1* | 5/2019 | Young | G06F 8/33 |
| 2019/0238799 | A1* | 8/2019 | Mahmoud | H04N 23/667 |
| 2020/0351173 | A1* | 11/2020 | Vasseur | H04L 41/16 |
| 2023/0004475 | A1* | 1/2023 | Zhang | G06F 11/3006 |
| 2023/0156084 | A1* | 5/2023 | Zhong | H04L 41/0816 709/224 |

FOREIGN PATENT DOCUMENTS

| | | |
|---|---|---|
| CN | 107222360 A | 9/2017 |
| CN | 109753401 A | 5/2019 |
| CN | 109918190 A | 6/2019 |
| CN | 107124445 B | 12/2019 |
| CN | 110879109 A | 3/2020 |
| CN | 110930689 A | 3/2020 |
| CN | 111294112 A | 6/2020 |
| WO | 2020114496 A1 | 6/2020 |
| WO | 2020140041 A1 | 7/2020 |

\* cited by examiner

DATA COLLECTION METHOD AND DEVICE

CROSS-REFERENCE TO RELATED APPLICATIONS

This application is a continuation of International Application No. PCT/CN2021/105576, filed on Jul. 9, 2021, which claims priority to Chinese Patent Application No. 202010665910.7, filed on Jul. 12, 2020. The disclosures of the aforementioned applications are hereby incorporated by reference in their entireties.

TECHNICAL FIELD

This application relates to the communications field, and in particular, to a data collection method and a device.

BACKGROUND

With the diversified development of services of communication networks, an intelligent analysis service that is based on network data is widely used. For example, data is collected from a network device (a router, a switch, or the like), and then massive data is analyzed according to a conventional data statistics method or based on an artificial intelligence (AI) algorithm, to obtain a result, for example, predict a network traffic trend or optimize a network radio channel.

A resource of the network device may be occupied for data collection, a network bandwidth is occupied for data reporting, and a large quantity of storage resources are occupied for data storage. Currently, an amount of collected data cannot be adjusted and controlled, an amount of collected, stored, and reported data is large, and excessively many resources are occupied.

SUMMARY

This application provides a data collection method and a device, so that a data collection amount can be reduced as much as possible, and resources can be saved when a service is implemented.

According to a first aspect, a data collection method is provided, including: A data collection device determines, based on a threshold corresponding to a target indicator, a collection interval for to-be-collected data of the target indicator from a plurality of available collection intervals; and the data collection device collects the data of the target indicator based on the collection interval.

In the data collection method provided in this application, a plurality of collection frequencies or collection periodicities are configured for the indicator. The plurality of collection periodicities may represent the plurality of available collection intervals, and the plurality of collection frequencies may also represent the plurality of available collection intervals. The data collection device may determine, based on the threshold corresponding to the indicator, the collection interval for collecting the data of the indicator. Amounts of data collected at different collection intervals are different, so that a data collection amount is adjusted by changing the collection interval. For example, when a collection frequency is low, a collection interval is large, and an amount of collected data is small. An overall data collection amount can be reduced, so that a data reporting amount of the data collection device is reduced and network resources are saved. In addition, storage space of a data receiving device can be further saved.

With reference to the first aspect, in a first possible implementation of the first aspect, the collection interval is represented by a collection periodicity or a collection frequency.

In this application, the collection interval may be represented by the frequency or the periodicity. The data collection device may determine the collection interval based on the collection frequency or the collection periodicity, and dynamically adjust and control the data collection amount by using different collection intervals.

With reference to the first aspect, in a second possible implementation of the first aspect, that a data collection device determines, based on a threshold corresponding to a target indicator, a collection interval for to-be-collected data of the target indicator includes: determining the collection interval based on a value relationship between collected data of the target indicator and the threshold.

In this application, an implementation of determining the collection interval based on the threshold of the indicator is provided. The collection interval is determined by comparing the data of the indicator with the threshold. When an amount of the data of the indicator changes, the collection interval may also change, so that the data collection amount is dynamically adjusted and controlled.

With reference to the first aspect or any possible implementation of the first aspect, in a third possible implementation of the first aspect, the target indicator corresponds only to one threshold, and the determining the collection interval based on a value relationship between collected data of the target indicator and the threshold includes: If the collected data of the target indicator is greater than or equal to the threshold, the collection interval is a first interval, and if the collected data of the target indicator is less than the threshold, the collection interval is a second interval. Alternatively, if the collected data of the target indicator is greater than the threshold, the collection interval is a first interval, and if the collected data of the target indicator is less than or equal to the threshold, the collection interval is a second interval. The first interval is different from the second interval.

In this application, a waterline (threshold) may be set to adjust and control the data collection amount. Different collection intervals are used above and below the waterline, so that the data collection amount is dynamically adjusted and controlled.

With reference to the first aspect, or the first or second possible implementation of the first aspect, in a fourth possible implementation of the first aspect, the target indicator corresponds to a plurality of thresholds, the plurality of thresholds include a first threshold and a second threshold, and the second threshold is greater than the first threshold. The determining the collection interval based on a value relationship between collected data of the target indicator and the threshold includes: If the collected data of the target indicator is less than the first threshold, the collection interval is a first interval, and if the collected data of the target indicator is greater than the second threshold, the collection interval is a third interval. Alternatively, if the collected data of the target indicator is less than or equal to the first threshold, the collection interval is a first interval, and if the collected data of the target indicator is greater than the second threshold, the collection interval is a third interval. Alternatively, if the collected data of the target indicator is less than the first threshold, the collection interval is a first interval, and if the collected data of the target indicator is greater than or equal to the second threshold, the collection interval is a third interval. Alternatively, if the collected data of the target indicator is less than or equal to the first threshold, the collection interval is a first interval, and if the collected data of the target indicator is greater than or equal to the second threshold, the collection interval is a third interval.

In this application, a plurality of waterlines (thresholds) may be set to adjust and control the data collection amount. Different collection intervals are used above and below the waterline, so that the data collection amount is dynamically adjusted and controlled.

With reference to the fourth possible implementation of the first aspect, in a fifth possible implementation of the first aspect, the plurality of thresholds are two thresholds. The determining the collection interval based on a value relationship between collected data of the target indicator and the threshold includes: If the collected data of the target indicator is greater than the first threshold and less than the second threshold, the collection interval is a second interval. Alternatively, if the collected data of the target indicator is greater than or equal to the first threshold and less than the second threshold, the collection interval is a second interval. Alternatively, if the collected data of the target indicator is greater than the first threshold and less than or equal to the second threshold, the collection interval is a second interval. Alternatively, if the collected data of the target indicator is greater than or equal to the first threshold and less than or equal to the second threshold, the collection interval is a second interval. The first threshold is different from the second threshold, and the second threshold is different from the third threshold.

In this application, two waterlines (thresholds) may be set to adjust and control the data collection amount. Different collection intervals are used above and below the waterline, so that the data collection amount is dynamically adjusted and controlled.

With reference to the fifth possible implementation of the first aspect, in a sixth possible implementation of the first aspect, the first threshold is greater than the second threshold, and the second threshold is greater than the third threshold.

In this application, if the value of the data of the indicator is larger, performance represented by the indicator is poorer. For an anomaly detection-type service, data with poor performance needs to be paid more attention to. Therefore, a larger value of the data of the indicator indicates a smaller collection interval, and more data with poor performance can be collected. This helps implement a service.

With reference to the sixth possible implementation of the first aspect, in a seventh possible implementation of the first aspect, a larger value of data of the target indicator indicates poorer performance represented by the target indicator.

With reference to the seventh possible implementation of the first aspect, in an eighth possible implementation of the first aspect, the target indicator is a throughput or a temperature of a central processing unit CPU.

With reference to the fifth possible implementation of the first aspect, in a ninth possible implementation of the first aspect, the first threshold is less than the second threshold, and the second threshold is less than the third threshold.

In this application, if the value of the data of the indicator is smaller, performance represented by the indicator is poorer. For an anomaly detection-type service, data with poor performance needs to be paid more attention to. Therefore, a smaller value of the data of the indicator indicates a smaller collection interval, and more data with poor performance can be collected. This helps implement a service.

With reference to the ninth possible implementation of the first aspect, in a tenth possible implementation of the first aspect, a larger value of data of the target indicator indicates better performance represented by the target indicator.

With reference to the tenth possible implementation of the first aspect, in an eleventh possible implementation of the first aspect, the target indicator is a radio signal strength or an optical power.

With reference to the first aspect or any one of the possible implementations of the first aspect, in an eleventh possible implementation of the first aspect, the method further includes: The data collection device sends the data of the target indicator to a data receiving device.

With reference to the first aspect or any one of the possible implementations of the first aspect, in a twelfth possible implementation of the first aspect, before that a data collection device determines, based on a threshold corresponding to a target indicator, a collection interval for to-be-collected data of the target indicator, the method further includes: The data collection device receives a data collection policy from a controller. The data collection policy includes the threshold and/or collection interval indication information. The collection interval indication information is a plurality of collection frequencies or a plurality of collection periodicities. The plurality of collection frequencies or the plurality of collection periodicities represent the plurality of available collection intervals.

In this application, the data collection device may obtain the data collection policy from the controller, and determine the plurality of available collection intervals based on the data collection policy. The data collection amount is dynamically adjusted by using the different collection intervals.

With reference to the thirteenth possible implementation of the first aspect, in a fourteenth possible implementation of the first aspect, before that the data collection device receives a data collection policy from a controller, the method further includes: The data collection device sends capability information of the data collection device to the controller. The capability information of the data collection device indicates at least one of the following: a data attribute supported by the data collection device, a capability of the data collection device to determine a collection interval for data of an indicator based on a threshold of the indicator, a collection frequency supported by the data collection device, and a collection periodicity supported by the data collection device. The data attribute includes a data format, data precision, and/or a data bit width. The capability information of the data collection device is used by the controller to determine the data collection policy.

In this application, the controller determines the data collection policy based on the capability information reported by the data collection device.

With reference to the first aspect or any one of the possible implementations of the first aspect, in a fifteenth possible implementation of the first aspect, before that a data collection device determines, based on a threshold corresponding to a target indicator, a collection interval for to-be-collected data of the target indicator, the method further includes: obtaining receive-end capability information, where the receive-end capability information is generated based on capability information of the data receiving device and/or a data specification requirement of a data analysis device. The data collection device determines the data collection policy based on the receive-end capability information. The data collection policy includes the threshold and/or collection interval indication information. The collection interval indication information is a plurality of collection frequencies or a plurality of collection periodicities. The plurality of collection frequencies or the plurality of collection periodicities represent the plurality of available collection intervals.

In this application, the data collection device may determine the data collection policy, including the plurality of available collection intervals. The data collection amount is dynamically adjusted by using the different collection intervals.

With reference to the fifteenth possible implementation of the first aspect, in a sixteenth possible implementation of the first aspect, the capability information of the data receiving device indicates at least one of the following: a data attribute supported by the data receiving device, a data reporting frequency supported by the data receiving device, and a data reporting periodicity supported by the data receiving device. The data attribute includes a data format, data precision, and/or a data bit width. The data specification requirement of the data analysis device includes data precision of a service requirement.

With reference to the first aspect or any one of the possible implementations of the first aspect, in a seventeenth possible implementation of the first aspect, the method further includes: sending, to the data receiving device, the data that is collected based on the collection interval and that is of the target indicator.

With reference to the first aspect or any one of the possible implementations of the first aspect, in an eighteenth possible implementation of the first aspect, the method further includes: adjusting the threshold based on a data characteristic and/or data amount adjustment indication information of the data of the target indicator; or adjusting at least one of the plurality of available collection intervals based on a data characteristic and/or data amount adjustment indication information of the data of the target indicator. The data characteristic includes at least one of the following: a data physical characteristic, a data distribution feature, and a data collection result evaluation. The data collection result evaluation represents a degree of impact, on performance of the data collection device, of collecting the data of the target indicator by the data collection device based on a current collection frequency. The data amount adjustment indication information indicates to increase or decrease a data collection amount, or indicates a data collection frequency expected by the controller.

In this application, the data collection device may further adjust an initial data collection policy, for example, adjust the threshold of the indicator or adjust the available collection interval, so that the data collection amount can be adjusted more accurately.

With reference to the thirteenth possible implementation of the first aspect, in a nineteenth possible implementation of the first aspect, the controller and the data receiving device are a same device, or the controller and the data receiving device are different devices.

With reference to the first aspect or any one of the possible implementations of the first aspect, in a twentieth possible implementation of the first aspect, the method further includes: sending, to the controller, the collection frequency or the collection periodicity representing the collection interval.

With reference to the second possible implementation of the first aspect, in a twenty-first possible implementation of the first aspect, the sending, to the controller, the collection periodicity or the collection frequency representing the collection interval includes: when a collection interval for the target indicator changes, sending, to the controller, the collection periodicity or the collection frequency representing the collection interval.

With reference to the first aspect or any one of the possible implementations of the first aspect, in a twenty-second possible implementation of the first aspect, the method further includes: sending the threshold to the controller.

According to a second aspect, a data collection method is disclosed, including: determining a data collection policy of a target indicator, where the data collection policy includes collection interval indication information, the collection interval indication information is a plurality of collection frequencies or a plurality of collection periodicities, and the plurality of collection frequencies or the plurality of collection periodicities represent a plurality of available collection intervals for collecting data of the target indicator; and sending the data collection policy to a data collection device.

With reference to the second aspect, in a first possible implementation of the second aspect, the determining a data collection policy of a target indicator includes: obtaining capability information of the data collection device, a data specification requirement of a data analysis device, and/or capability information of a data receiving device; and determining the data collection policy based on the capability information of the data collection device, the data specification requirement, and/or the capability information of the data receiving device.

With reference to the first possible implementation of the second aspect, in a second possible implementation of the second aspect, the obtaining capability information of the data collection device, a data specification requirement of a data analysis device, and/or capability information of a data receiving device includes: receiving the capability information of the data collection device from the data collection device; and/or receiving the capability information of the data receiving device from the data receiving device; and/or receiving the data specification requirement from the data analysis device.

With reference to the second aspect or any one of the possible implementations of the second aspect, in a third possible implementation of the second aspect, the data collection policy further includes a threshold corresponding to the target indicator. The threshold corresponding to the target indicator is for determining a collection interval for the data of the target indicator.

With reference to the second aspect, in a fourth possible implementation of the second aspect, the method further includes: determining receive-end capability information based on capability information of a data receiving device and/or a data specification requirement of a data analysis device; and sending the receive-end capability information to the data collection device. The receive-end capability information is used by the data collection device to determine the data collection policy.

With reference to the second aspect or any one of the possible implementations of the second aspect, in a fifth possible implementation of the second aspect, the capability information of the data collection device indicates at least one of the following: a data attribute supported by the data collection device, a capability of the data collection device to determine a collection interval for data of an indicator based on a threshold of the indicator, a collection frequency supported by the data collection device, and a collection periodicity supported by the data collection device. The data attribute includes a data format, data precision, and/or a data bit width. The capability information of the data receiving device indicates at least one of the following: a data attribute supported by the data receiving device, a data reporting frequency supported by the data receiving device, and a data reporting periodicity supported by the data receiving device. The data specification requirement of the data analysis device includes data precision of a service requirement.

With reference to the second aspect or any one of the possible implementations of the second aspect, in a sixth possible implementation of the second aspect, the method further includes: receiving the data of the target indicator from the data collection device.

With reference to the second aspect or any one of the possible implementations of the second aspect, in a seventh possible implementation of the second aspect, the method further includes: determining a resource occupation status and an evaluation result of a service requirement satisfaction degree based on the data of the target indicator, where the resource occupation status includes a network-bandwidth occupation status and/or a storage-space occupation status of the data receiving device, and the service requirement satisfaction degree represents whether the currently collected data satisfies the service requirement; determining data amount adjustment indication information based on the resource occupation status and the evaluation result of the service requirement satisfaction degree, where the data amount adjustment indication information indicates to increase or decrease a data collection amount; and sending the data amount adjustment indication information to the data collection device.

With reference to the second aspect or any one of the possible implementations of the second aspect, in an eighth possible implementation of the second aspect, the method further includes: receiving, from the data collection device, a collection frequency or a collection periodicity representing the collection interval for the data of the target indicator.

With reference to the second aspect or any one of the possible implementations of the second aspect, in a ninth possible implementation of the second aspect, the method further includes: receiving the threshold corresponding to the target indicator from the data collection device.

With reference to the second aspect or any one of the possible implementations of the second aspect, in a tenth possible implementation of the second aspect, an execution body of the method, the data analysis device, and the data receiving device are a same device.

According to a third aspect, a data collection device is provided, including: a determining unit, configured to determine, based on a threshold corresponding to a target indicator, a collection interval for to-be-collected data of the target indicator from a plurality of available collection intervals; and a collection unit, configured to collect the data of the target indicator based on the collection interval.

In this application, a plurality of collection frequencies or collection periodicities are configured for the indicator. The plurality of collection periodicities may represent the plurality of available collection intervals, and the plurality of collection frequencies may also represent the plurality of available collection intervals. The data collection device may determine, based on the threshold corresponding to the indicator, the collection interval for collecting the data of the indicator. Amounts of data collected at different collection intervals are different, so that a data collection amount is adjusted by changing the collection interval. For example, when a collection frequency is low, a collection interval is large, and an amount of collected data is small. An overall data collection amount can be reduced, so that a data reporting amount of the data collection device is reduced and network resources are saved. In addition, storage space of a data receiving device can be further saved.

With reference to the third aspect, in a first possible implementation of the third aspect, the collection interval is represented by a collection periodicity or a collection frequency.

In this application, the collection interval may be represented by the frequency or the periodicity. The data collection device may determine the collection interval based on the collection frequency or the collection periodicity, and dynamically adjust and control the data collection amount by using different collection intervals.

With reference to the third aspect, in a second possible implementation of the third aspect, the determining unit is specifically configured to determine the collection interval based on a value relationship between collected data of the target indicator and the threshold.

In this application, an implementation of determining the collection interval based on the threshold of the indicator is provided. The collection interval is determined by comparing the data of the indicator with the threshold. When an amount of the data of the indicator changes, the collection interval may also change, so that the data collection amount is dynamically adjusted and controlled.

With reference to the third aspect or any one of the possible implementations of the third aspect, in a third possible implementation of the third aspect, the target indicator corresponds only to one threshold, and the determining unit is specifically configured to: if the collected data of the target indicator is greater than or equal to the threshold, determine that the collection interval is a first interval, and if the collected data of the target indicator is less than the threshold, determine that the collection interval is a second interval; or if the collected data of the target indicator is greater than the threshold, determine that the collection interval is a first interval, and if the collected data of the target indicator is less than or equal to the threshold, determine that the collection interval is a second interval. The first interval is different from the second interval.

In this application, a waterline (threshold) may be set to adjust and control the data collection amount. Different collection intervals are used above and below the waterline, so that the data collection amount is dynamically adjusted and controlled.

With reference to the third aspect, or the first or second possible implementation of the third aspect, in a fourth possible implementation of the third aspect, the target indicator corresponds to a plurality of thresholds, the plurality of thresholds include a first threshold and a second threshold, and the second threshold is greater than the first threshold; and the determining unit is specifically configured to: if the collected data of the target indicator is less than the first threshold, determine that the collection interval is a first interval, and if the collected data of the target indicator is greater than the second threshold, determine that the collection interval is a third interval; if the collected data of the target indicator is less than or equal to the first threshold, determine that the collection interval is a first interval, and if the collected data of the target indicator is greater than the second threshold, determine that the collection interval is a third interval; if the collected data of the target indicator is less than the first threshold, determine that the collection interval is a first interval, and if the collected data of the target indicator is greater than or equal to the second threshold, determine that the collection interval is a third interval; or if the collected data of the target indicator is less than or equal to the first threshold, determine that the collection interval is a first interval, and if the collected data of the target indicator is greater than or equal to the second threshold, determine that the collection interval is a third interval.

In this application, a plurality of waterlines (thresholds) may be set to adjust and control the data collection amount. Different collection intervals are used above and below the waterline, so that the data collection amount is dynamically adjusted and controlled.

With reference to the fourth possible implementation of the third aspect, in a fifth possible implementation of the third aspect, the plurality of thresholds are two thresholds. If the collected data of the target indicator is greater than the first threshold and less than the second threshold, the collection interval is a second interval. Alternatively, if the collected data of the target indicator is greater than or equal to the first threshold and less than the second threshold, the collection interval is a second interval. Alternatively, if the collected data of the target indicator is greater than the first threshold and less than or equal to the second threshold, the collection interval is a second interval. Alternatively, if the collected data of the target indicator is greater than or equal to the first threshold and less than or equal to the second threshold, the collection interval is a second interval. The first threshold is different from the second threshold, and the second threshold is different from the third threshold.

In this application, two waterlines (thresholds) may be set to adjust and control the data collection amount. Different collection intervals are used above and below the waterline, so that the data collection amount is dynamically adjusted and controlled.

With reference to the fifth possible implementation of the third aspect, in a sixth possible implementation of the third aspect, the first threshold is greater than the second threshold, and the second threshold is greater than the third threshold.

In this application, if the value of the data of the indicator is larger, performance represented by the indicator is poorer. For an anomaly detection-type service, data with poor performance needs to be paid more attention to. Therefore, a larger value of the data of the indicator indicates a smaller collection interval, and more data with poor performance can be collected. This helps implement a service.

With reference to the sixth possible implementation of the third aspect, in a seventh possible implementation of the third aspect, a larger value of data of the target indicator indicates poorer performance represented by the target indicator.

With reference to the seventh possible implementation of the third aspect, in an eighth possible implementation of the third aspect, the target indicator is a throughput or a temperature of a central processing unit CPU.

With reference to the fifth possible implementation of the third aspect, in a ninth possible implementation of the third aspect, the first threshold is less than the second threshold, and the second threshold is less than the third threshold.

In this application, if the value of the data of the indicator is smaller, performance represented by the indicator is poorer. For an anomaly detection-type service, data with poor performance needs to be paid more attention to. Therefore, a smaller value of the data of the indicator indicates a smaller collection interval, and more data with poor performance can be collected. This helps implement a service.

With reference to the ninth possible implementation of the third aspect, in a tenth possible implementation of the third aspect, a larger value of data of the target indicator indicates better performance represented by the target indicator.

With reference to the tenth possible implementation of the third aspect, in an eleventh possible implementation of the third aspect, the target indicator is a radio signal strength or an optical power.

With reference to the third aspect or any one of the possible implementations of the third aspect, in an eleventh possible implementation of the third aspect, the device further includes a communication unit. The communication unit is configured to send the data of the target indicator to a data receiving device.

With reference to the third aspect or any one of the possible implementations of the third aspect, in a twelfth possible implementation of the third aspect, the communication unit is further configured to: before the determining unit determines, based on the threshold corresponding to the target indicator, the collection interval for the to-be-collected data of the target indicator, receive a data collection policy from a controller. The data collection policy includes the threshold and/or collection interval indication information. The collection interval indication information is a plurality of collection frequencies or a plurality of collection periodicities. The plurality of collection frequencies or the plurality of collection periodicities represent the plurality of available collection intervals.

In this application, the data collection device may obtain the data collection policy from the controller, and determine the plurality of available collection intervals based on the data collection policy. The data collection amount is dynamically adjusted by using the different collection intervals.

With reference to the thirteenth possible implementation of the third aspect, in a fourteenth possible implementation of the third aspect, the communication unit is further configured to: before receiving the data collection policy from the controller, send capability information of the data collection device to the controller. The capability information of the data collection device indicates at least one of the following: a data attribute supported by the data collection device, a capability of the data collection device to determine a collection interval for data of an indicator based on a threshold of the indicator, a collection frequency supported by the data collection device, and a collection periodicity supported by the data collection device. The data attribute includes a data format, data precision, and/or a data bit width. The capability information of the data collection device is used by the controller to determine the data collection policy.

In this application, the controller determines the data collection policy based on the capability information reported by the data collection device.

With reference to the third aspect or any one of the possible implementations of the third aspect, in a fifteenth possible implementation of the third aspect, the determining unit is further configured to: before determining, based on the threshold corresponding to the target indicator, the collection interval for the to-be-collected data of the target indicator, obtain receive-end capability information, where the receive-end capability information is generated based on capability information of a data receiving device and/or a data specification requirement of a data analysis device. The determining unit is further configured to determine the data collection policy based on the receive-end capability information. The data collection policy includes the threshold and/or collection interval indication information. The collection interval indication information is a plurality of collection frequencies or a plurality of collection periodicities. The plurality of collection frequencies or the plurality of collection periodicities represent the plurality of available collection intervals.

In this application, the data collection device may determine the data collection policy, including the plurality of available collection intervals. The data collection amount is dynamically adjusted by using the different collection intervals.

With reference to the fifteenth possible implementation of the third aspect, in a sixteenth possible implementation of the third aspect, the capability information of the data receiving device indicates at least one of the following: a data attribute supported by the data receiving device, a data reporting frequency supported by the data receiving device, and a data reporting periodicity supported by the data receiving device. The data attribute includes a data format, data precision, and/or a data bit width. The data specification requirement of the data analysis device includes data precision of a service requirement.

With reference to the third aspect or any one of the possible implementations of the third aspect, in a seventeenth possible implementation of the third aspect, the communication unit is further configured to send, to the data receiving device, the data that is collected based on the collection interval and that is of the target indicator.

With reference to the third aspect or any one of the possible implementations of the third aspect, in an eighteenth possible implementation of the third aspect, the determining unit is further configured to adjust the threshold based on a data characteristic and/or data amount adjustment indication information of the data of the target indicator; or adjust at least one of the plurality of available collection intervals based on a data characteristic and/or data amount adjustment indication information of the data of the target indicator. The data characteristic includes at least one of the following: a data physical characteristic, a data distribution feature, and a data collection result evaluation. The data collection result evaluation represents a degree of impact, on performance of the data collection device, of collecting the data of the target indicator by the data collection device based on a current collection frequency. The data amount adjustment indication information indicates to increase or decrease a data collection amount, or indicates a data collection frequency expected by the controller.

In this application, the data collection device may further adjust an initial data collection policy, for example, adjust the threshold of the indicator or adjust the available collection interval, so that the data collection amount can be adjusted more accurately.

With reference to the thirteenth possible implementation of the third aspect, in a nineteenth possible implementation of the third aspect, the controller and the data receiving device are a same device, or the controller and the data receiving device are different devices.

With reference to the third aspect or any one of the possible implementations of the third aspect, in a twentieth possible implementation of the third aspect, the communication unit is further configured to send, to the controller, the collection periodicity or the collection frequency representing the collection interval.

With reference to the second possible implementation of the third aspect, in a twenty-first possible implementation of the third aspect, the communication unit is specifically configured to: when a collection interval for the target indicator changes, send, to the controller, the collection periodicity or the collection frequency representing the collection interval.

With reference to the third aspect or any one of the possible implementations of the third aspect, in a twenty-second possible implementation of the third aspect, the communication unit is further configured to send the threshold to the controller.

According to a fourth aspect, a controller is disclosed, including: a determining unit, configured to determine a data collection policy of a target indicator, where the data collection policy includes collection interval indication information, the collection interval indication information is a plurality of collection frequencies or a plurality of collection periodicities, and the plurality of collection frequencies or the plurality of collection periodicities represent a plurality of available collection intervals for collecting data of the target indicator; and a communication unit, configured to send the data collection policy to a data collection device.

With reference to the fourth aspect, in a first possible implementation of the fourth aspect, that a determining unit determines a data collection policy of a target indicator includes: obtaining capability information of the data collection device, a data specification requirement of a data analysis device, and/or capability information of a data receiving device; and determining the data collection policy based on the capability information of the data collection device, the data specification requirement, and/or the capability information of the data receiving device.

With reference to the first possible implementation of the fourth aspect, in a second possible implementation of the fourth aspect, that the determining unit obtains capability information of the data collection device, a data specification requirement of a data analysis device, and/or capability information of a data receiving device includes: receiving the capability information of the data collection device from the data collection device by using the communication unit; and/or receiving the capability information of the data receiving device from the data receiving device by using the communication unit; and/or receiving the data specification requirement from the data analysis device by using the communication unit.

With reference to the fourth aspect or any one of the possible implementations of the fourth aspect, in a third possible implementation of the fourth aspect, the data collection policy further includes a threshold corresponding to the target indicator. The threshold corresponding to the target indicator is for determining a collection interval for the data of the target indicator.

With reference to the fourth aspect, in a fourth possible implementation of the fourth aspect, the determining unit is further configured to determine receive-end capability information based on capability information of a data receiving device and/or a data specification requirement of a data analysis device; and send the receive-end capability information to the data collection device. The receive-end capability information is used by the data collection device to determine the data collection policy.

With reference to the fourth aspect or any one of the possible implementations of the fourth aspect, in a fifth possible implementation of the fourth aspect, the capability information of the data collection device indicates at least one of the following: a data attribute supported by the data collection device, a capability of the data collection device to determine a collection interval for data of an indicator based on a threshold of the indicator, a collection frequency supported by the data collection device, and a collection periodicity supported by the data collection device. The data attribute includes a data format, data precision, and/or a data bit width. The capability information of the data receiving device indicates at least one of the following: a data attribute supported by the data receiving device, a data reporting frequency supported by the data receiving device, and a data reporting periodicity supported by the data receiving device. The data specification requirement of the data analysis device includes data precision of a service requirement.

With reference to the fourth aspect or any one of the possible implementations of the fourth aspect, in a sixth possible implementation of the fourth aspect, the communication unit is further configured to receive the data of the target indicator from the data collection device.

With reference to the fourth aspect or any one of the possible implementations of the fourth aspect, in a seventh possible implementation of the fourth aspect, the determining unit is further configured to determine a resource occupation status and an evaluation result of a service requirement satisfaction degree based on the data of the target indicator, where the resource occupation status includes a network-bandwidth occupation status and/or a storage-space occupation status of the data receiving device, and the service requirement satisfaction degree represents whether the currently collected data satisfies the service requirement; determine data amount adjustment indication information based on the resource occupation status and the evaluation result of the service requirement satisfaction degree, where the data amount adjustment indication information indicates to increase or decrease a data collection amount; and send the data amount adjustment indication information to the data collection device.

With reference to the fourth aspect or any one of the possible implementations of the fourth aspect, in an eighth possible implementation of the fourth aspect, the communication unit is configured to receive, from the data collection device, a collection frequency or a collection periodicity representing the collection interval for the data of the target indicator.

With reference to the fourth aspect or any one of the possible implementations of the fourth aspect, in a ninth possible implementation of the fourth aspect, the communication unit is configured to receive the threshold corresponding to the target indicator from the data collection device.

With reference to the fourth aspect or any one of the possible implementations of the fourth aspect, in a tenth possible implementation of the fourth aspect, the controller, the data analysis device, and the data receiving device are a same device.

According to a fifth aspect, a communication apparatus is provided, and includes at least one processor and a memory, where the at least one processor is coupled to the memory, and the memory is configured to store a computer program.

The at least one processor is configured to execute the computer program stored in the memory, to enable the apparatus to perform the method according to the first aspect and any one of the implementations of the first aspect, or the method according to the second aspect and any one of the implementations of the second aspect.

According to a sixth aspect, a computer-readable storage medium is provided. The computer-readable storage medium stores instructions; and when the computer-readable storage medium is run on the communication apparatus according to the third aspect and any one of the implementations of the third aspect, the communication apparatus is enabled to perform the communication method according to the first aspect and any one of the implementations of the first aspect.

According to a seventh aspect, a computer-readable storage medium is provided. The computer-readable storage medium stores instructions; and when the computer-readable storage medium is run on the communication apparatus according to the fourth aspect and any one of the implementations of the fourth aspect, the communication apparatus is enabled to perform the communication method according to the second aspect and any one of the implementations of the second aspect.

According to an eighth aspect, a communication apparatus is provided. The communication apparatus includes a processor, for example, used in the communication apparatus, to implement the method according to the first aspect and any one of the implementations of the first aspect. The communication apparatus may be, for example, a chip system. In a feasible implementation, the chip system further includes a memory, and the memory is configured to store program instructions and data that are necessary for implementing the functions of the method according to the first aspect.

According to a ninth aspect, a communication apparatus is provided. The communication apparatus includes a processor, for example, used in the communication apparatus, to implement the function or the method according to the second aspect and any one of the implementations of the second aspect. The communication apparatus may be, for example, a chip system. In a feasible implementation, the chip system further includes a memory, and the memory is configured to store program instructions and data that are necessary for implementing the functions of the method according to the second aspect.

The chip system in the foregoing aspect may be a system on chip (SOC) or a network processor (NP).

According to a tenth aspect, a system is provided, including a controller and a data collection apparatus. The controller is configured to determine a data collection policy of a target indicator, where the data collection policy includes collection interval indication information, the collection interval indication information is a plurality of collection frequencies or a plurality of collection periodicities, and the plurality of collection frequencies or the plurality of collection periodicities represent a plurality of available collection intervals for collecting data of the target indicator; and send the data collection policy to the data collection device.

The data collection device is configured to determine, based on a threshold corresponding to the target indicator, a collection interval for to-be-collected data of the target indicator from the plurality of available collection intervals; and collect the data of the target indicator based on the collection interval.

In a first possible implementation of the tenth aspect, the system further includes a data receiving device, and the data receiving device is configured to receive the data of the target indicator from the data collection device.

In a second possible implementation of the tenth aspect, the system further includes a data analysis device, and the data analysis device is configured to obtain the data of the target indicator from the data receiving device, to implement a service based on the data of the target indicator.

DETAILED DESCRIPTION OF ILLUSTRATIVE EMBODIMENTS

Figure 1:
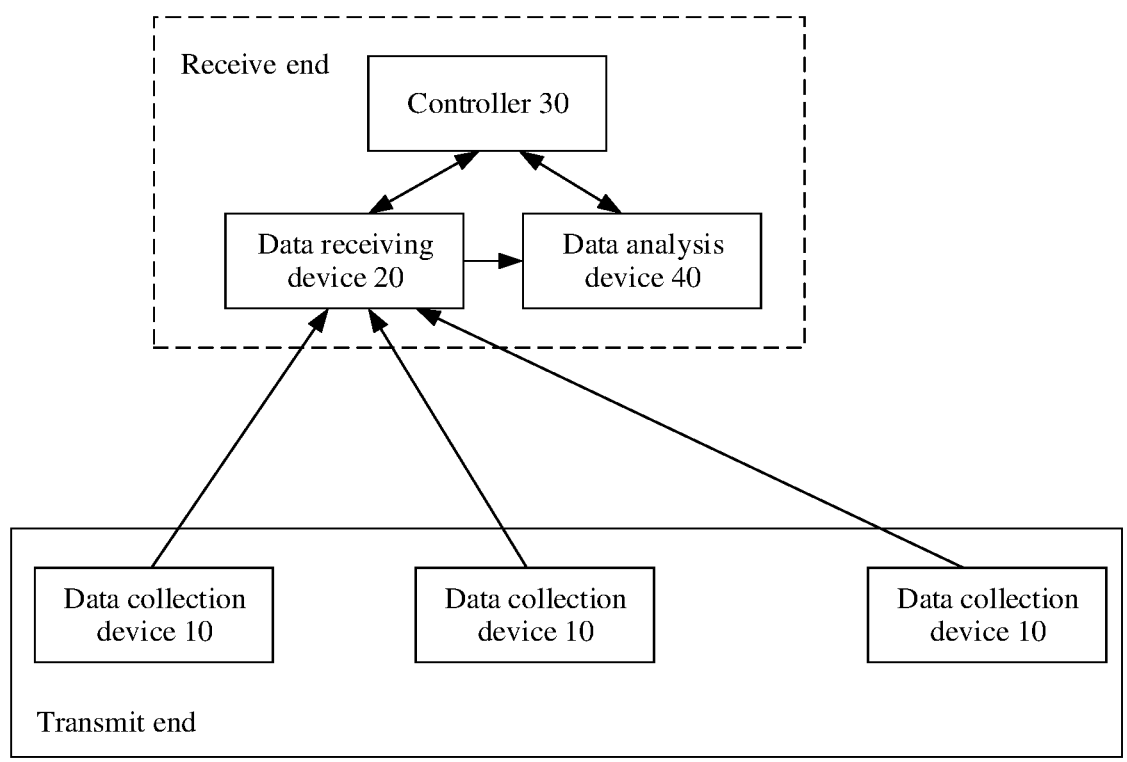
FIG. 1 is an architectural diagram of a system according to an embodiment of this application.

A method provided in embodiments of this application is applicable to a communication system shown in FIG. 1. The communication system includes data collection devices 10, a data receiving device 20, a controller 30, and a data analysis device 40. The controller 30 may also be referred to as a network management system, and the data analysis device may also be referred to as an analyzer. The data collection device 10 is configured to collect data (for example, a network throughput or a device temperature) of a target indicator, and may further send the collected data to the data receiving device 20 by using a network. The data receiving device 20 may receive the data from the data collection device 10, and may further store and convert the data. The data analysis device 40 may analyze the data, to implement a service requirement. For example, the data receiving device 20 may analyze the data by using an AI algorithm, to implement visualization. The controller 30 is configured to control the data receiving device 20 and the data analysis device 40, for example, determine a data receiving capability based on a capability of the data receiving device 20 and a capability of the data analysis device.

The data collection device 10 may be a network device. The network device may be a device having a data transmission capability. For example, the network device may be a router, a switch, or a wireless local area network access controller (WLAN AC). Alternatively, the network device may be an optical network unit (ONU), an optical line terminal (OLT), a cable modem (CM), a station (STA) in a wireless local area network (WLAN), an access point (AP), or the like.

In a specific implementation, the data receiving device 20, the controller 30, and the data analysis device 40 may be devices that are independently and separately disposed. Any two of the data receiving device 20, the controller 30, and the data analysis device 40 may be integrated into a same device. Alternatively, the data receiving device 20, the controller 30, and the data analysis device 40 may be integrated into a same device. This is not limited in this embodiment of this application. When the data receiving device 20, the controller 30, and the data analysis device 40 are integrated into a same device, the data receiving device 20, the controller 30, and the data analysis device 40 may be functional modules in the device. In this embodiment of this application, the data collection device 10 may be referred to as a transmit end, and the data receiving device 20, the controller 30, and the data analysis device 40 may be collectively referred to as a receive end.

First, terms in embodiments of this application are explained and described.

(1) Indicator

In embodiments of this application, the indicator may alternatively be a performance target indicator. For example, the indicator may be a key performance indicator (KPI). In a possible implementation, the indicator may represent performance of a device. For example, the indicator may be a utilization rate of a central processing unit (CPU) or an optical power. Alternatively, the indicator may represent performance of a network service. For example, the indicator may be network traffic, a network throughput, a packet loss rate, a delay, or a quantity of accessed users.

In addition, data of the indicator includes values, collected at different moments, of the indicator. For example, the indicator is a throughput. The data of the indicator may be throughput values collected by the data collection device 10 at different moments, for example, 0.9, 0.8, and 0.75.

(2) Collection Interval

In embodiments of this application, the collection interval is a time interval at which data of an indicator is collected. The collection interval may be represented by a collection periodicity or a collection frequency. When the collection periodicity is duration x, duration of the collection interval represented by the collection periodicity is x. When the collection frequency is f, duration of the collection interval represented by the collection frequency is 1/f.

In embodiments of this application, the collection frequency may be a frequency at which the data collection device 10 collects the data of the indicator. For example, a frequency of collecting a throughput by the data collection device is two times each second. To be specific, a time interval between collecting the data of the indicator twice is 0.5 s, and the data collection device 10 may collect data of the throughput once every 0.5 s.

Figure 2:
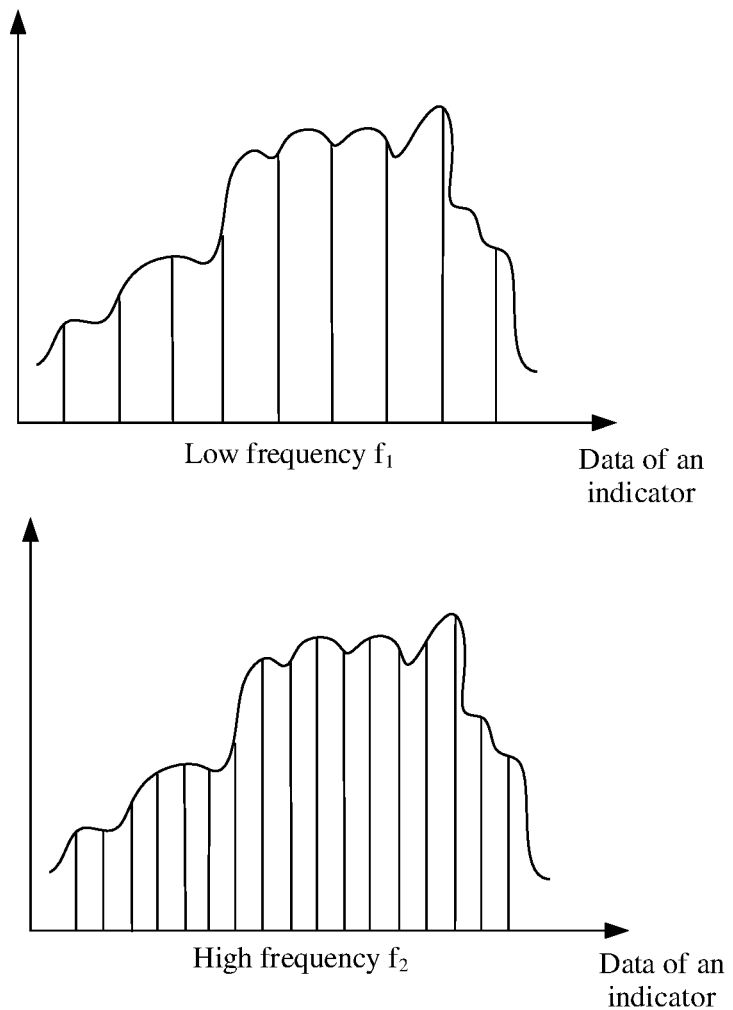
FIG. 2 is a schematic diagram of a collection frequency according to an embodiment of this application.

For example, FIG. 2 shows two different collection frequencies, which are separately $f_1$ and $f_2$, and $f_1$ is less than $f_2$. $f_1$ may be referred to as a low frequency, and $f_2$ may be referred to as a high frequency. Refer to FIG. 2. It can be learned that an amount of data collected by using $f_1$ in a time period is less than an amount of data collected by using $f_2$ in the same time period.

(3) Threshold Corresponding to an Indicator

In embodiments of this application, the threshold corresponding to the indicator is for determining different collection intervals. For example, for an indicator, a collection periodicity or a collection frequency may be determined based on a value relationship between collected data and a threshold corresponding to the indicator, so that a collection interval for subsequently collecting data of the indicator can be determined.

Figure 3:
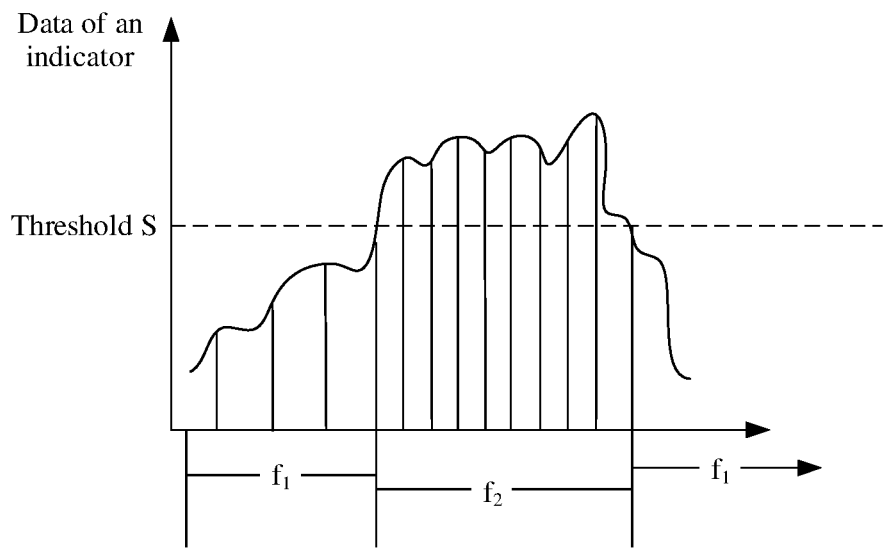
FIG. 3 is a schematic diagram of a threshold of an indicator according to an embodiment of this application.

For example, a collection frequency represents a collection interval. A threshold S of an indicator is set, to indicate two different collection frequencies by using the threshold corresponding to the indicator. Refer to FIG. 3. When collected data is less than the threshold S corresponding to the indicator, data of the indicator may be subsequently collected by using $f_1$. To be specific, a collection interval for the data is a time interval represented by $f_1$. When the collected data is greater than or equal to the threshold S corresponding to the indicator, the data of the indicator may be subsequently collected by using $f_2$. To be specific, the collection interval for the data is a time interval represented by $f_2$. In FIG. 3, $f_1$ is less than $f_2$. In other words, the collection interval represented by $f_1$ is larger than the collection interval represented by $f_2$. It may be understood that, that $f_1$ in FIG. 3 is less than $f_2$ is only a possible example. In this embodiment of this application, values of $f_1$ and $f_2$ are not limited, and $f_1$ and $f_2$ represent only two different collection frequencies. Alternatively, $f_1$ may be greater than $f_2$.

Figure 4:
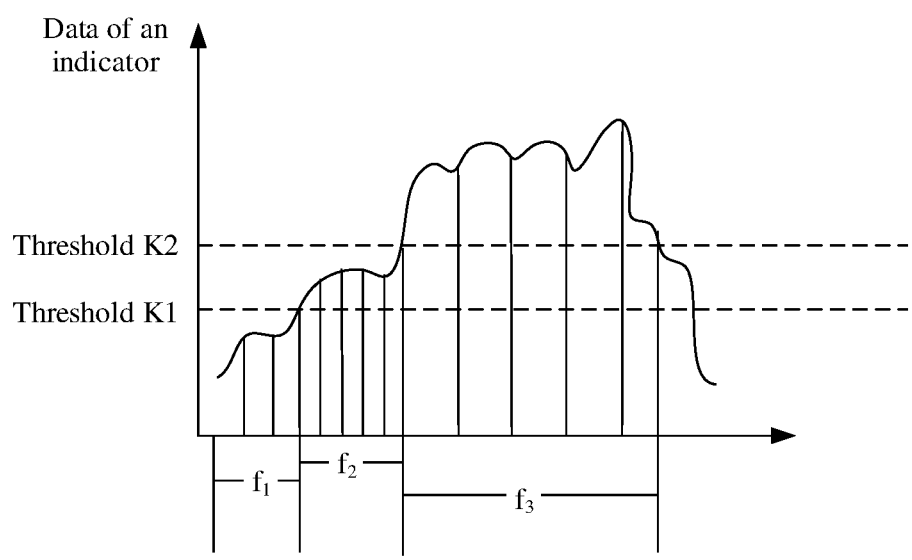
FIG. 4 is a schematic diagram of a threshold of another indicator according to an embodiment of this application.

Alternatively, for example, a collection frequency represents a collection interval. Two thresholds are set, to indicate different collection frequencies by using the thresholds corresponding to an indicator. Refer to FIG. 4. The thresholds corresponding to the indicator are set to K1 and K2, and K1 is less than K2. When collected data is less than the threshold K1 corresponding to the indicator, data of the indicator may be subsequently collected by using $f_1$. When the collected data is greater than or equal to the threshold K1 corresponding to the indicator and less than the threshold K2, the data of the indicator may be subsequently collected by using $f_2$. When the collected data is greater than or equal to the threshold K2, the data of the indicator may be subsequently collected by using $f_3$.

It should be noted that, that $f_3 < f_1 < f_2$ in FIG. 4 is only a possible example. $f_3$ represents a largest collection interval, $f_1$ represents a second largest collection interval, and $f_2$ represents a smallest collection interval. In this embodiment of this application, values of $f_1$, $f_2$, and $f_3$ are not limited, and $f_1$, $f_2$, and $f_3$ represent only different collection frequencies divided by using the thresholds corresponding to the indicator, provided that $f_1$ and $f_2$ are different, and $f_2$ and $f_3$ are different. Alternatively, $f_1$ may be greater than $f_2$, $f_3$ may be greater than $f_2$, and $f_1$ may be the same as $f_3$.

An embodiment of this application provides a data collection method. A plurality of collection frequencies or collection periodicities are configured for an indicator. The plurality of collection periodicities may represent a plurality of available collection intervals, and the plurality of collection frequencies may also represent the plurality of available collection intervals. A data collection device may determine, based on a threshold corresponding to the indicator, a collection interval for collecting data of the indicator. Amounts of data collected at different collection intervals are different, so that a data collection amount is adjusted by changing the collection interval. For example, when a collection frequency is low, a collection interval is large, and an amount of collected data is small. An overall data collection amount can be reduced, so that a data reporting amount of the data collection device is reduced and network resources are saved. In addition, storage space of a data receiving device can be further saved.

Figure 5:
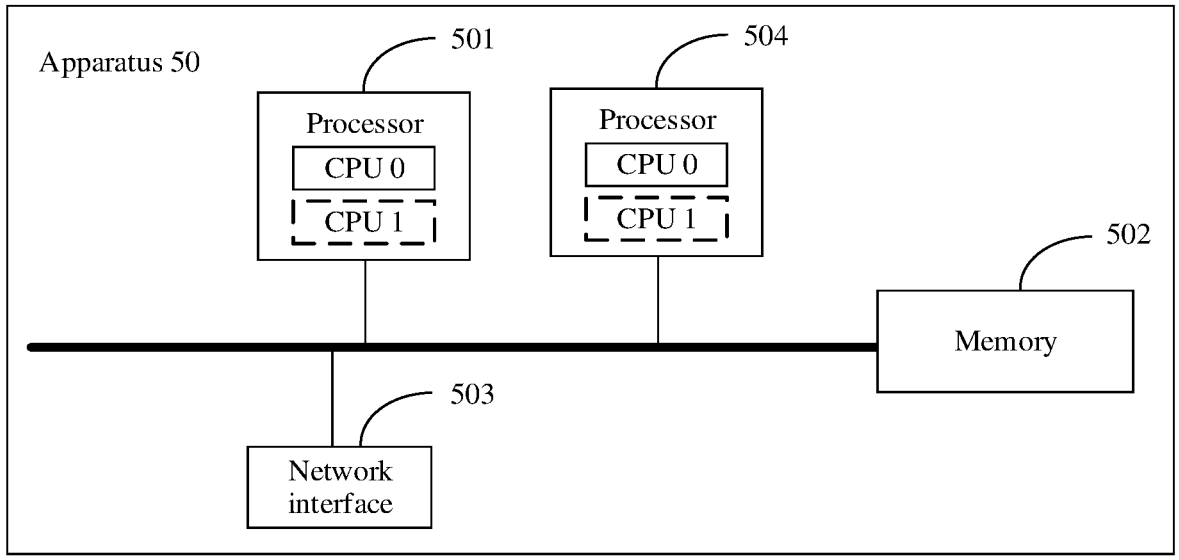
FIG. 5 is a structural block diagram of an apparatus according to an embodiment of this application.

FIG. 5 is a schematic diagram of a hardware structure of an apparatus 50 according to an embodiment of this application. The apparatus 50 may be deployed on a device in the system shown in FIG. 1, or may be a device in the system shown in FIG. 1. For example, the apparatus 50 is the data collection device 10, the data receiving device 20, the controller 30, or the data analysis device 40. Refer to FIG. 5. The apparatus 50 includes a processor 501, a memory 502, and at least one network interface (in FIG. 5, only an example in which a network interface 503 is included is used for description). The processor 501, the memory 502, and the network interface 503 are connected to each other.

The processor 501 may be a general-purpose CPU, a microprocessor, an application-specific integrated circuit (ASIC), or one or more integrated circuits configured to control program execution of the solutions of this application.

The network interface 503 is an interface of the apparatus 50, and is configured to communicate with another device or a communication network such as the Ethernet, a radio access network (RAN), or a WLAN.

The memory 502 may be a read-only memory (ROM) or another type of static data center that can store static information and instructions, or a random access memory (RAM) or another type of dynamic data center that can store information and instructions, or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), a magnetic disk storage medium or another magnetic data center, or any other medium that can be used to carry or store expected program code in a form of an instruction or a data structure and that is accessible by a computer. This is not limited thereto. The memory may exist independently, and is connected to the processor through a communication line. The memory may alternatively be integrated with the processor.

The memory 502 is configured to store computer-executable instructions for executing the solutions of this application, and the processor 501 controls the execution. The processor 501 is configured to execute the computer-executable instructions stored in the memory 502, to implement a data collection method provided in the following embodiments of this application.

Optionally, the computer-executable instructions in this embodiment of this application may also be referred to as application program code. This is not specifically limited in this embodiment of this application.

During specific implementation, in an embodiment, the processor 501 may include one or more CPUs, for example, a CPU 0 and a CPU 1 in FIG. 5.

In a specific implementation, in an embodiment, the apparatus 50 may include a plurality of processors, for example, the processor 501 and a processor 504 shown in FIG. 5. Each of the processors may be a single-core (single-CPU) processor, or may be a multi-core (multi-CPU) processor. The processor herein may be one or more devices, circuits, and/or processing cores configured to process data (for example, computer program instructions).

The apparatus 50 may be a general-purpose device or a dedicated device. In a specific implementation, the apparatus 50 may be a desktop computer, a network apparatus, an embedded device, or another device having a structure similar to that in FIG. 5. A type of the apparatus 50 is not limited in this embodiment of this application.

Figure 6:
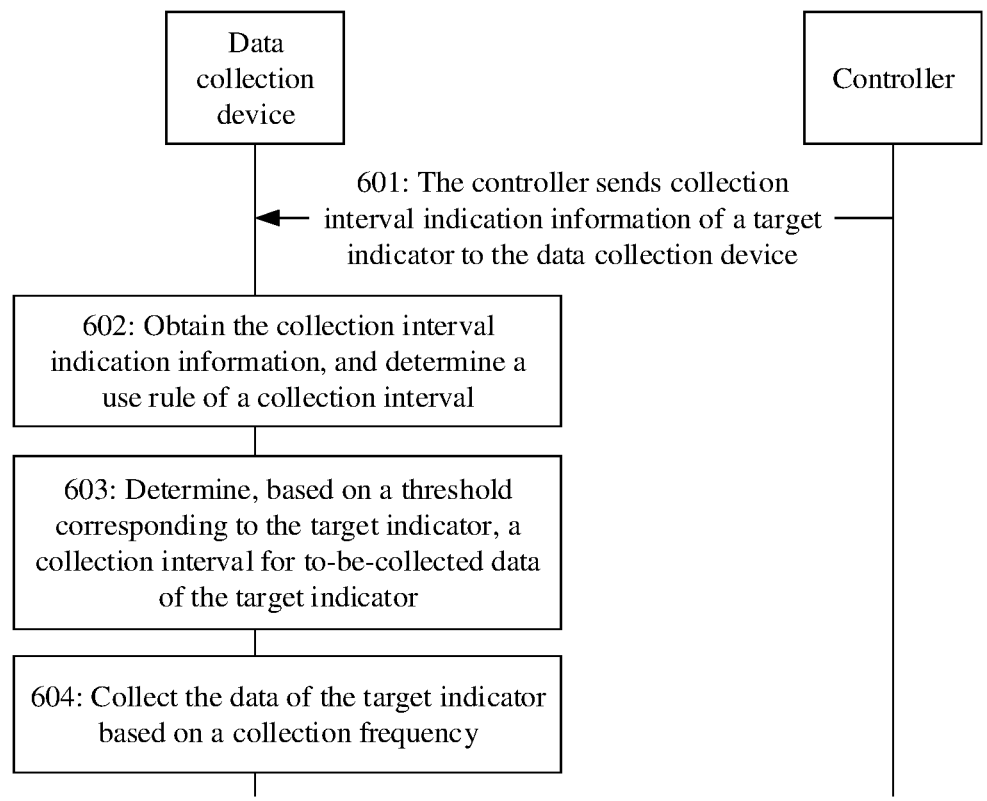
FIG. 6 is a schematic flowchart of a data collection method according to an embodiment of this application.

An embodiment of this application provides a data collection method. As shown in FIG. 6, the method includes the following steps.

601: A controller sends collection interval indication information of a target indicator to a data collection device.

The target indicator may be a performance indicator (for example, a key performance indicator KPI). The collection interval indication information of the target indicator is a plurality of collection frequencies or a plurality of collection periodicities. The plurality of collection frequencies may represent a plurality of available collection intervals, and the plurality of collection periodicities may represent the plurality of available collection intervals. Data of the target indicator may be collected based on a collection interval determined from the plurality of available collection intervals.

In a specific implementation, before step 601, the controller may determine a data collection policy based on capability information of the data collection device, a data specification requirement of a data analysis device, and capability information of a data receiving device.

The capability information of the data collection device indicates at least one of the following: a data attribute supported by the data collection device, a capability of the data collection device to determine a collection interval for data of an indicator based on a threshold of the indicator, a collection frequency supported by the data collection device, and a collection periodicity supported by the data collection device. The data attribute supported by the data collection device may be an attribute of data that can be collected by the data collection device. The collection frequency supported by the data collection device may be a collection frequency that can be used when the data collection device collects the data of the target indicator. The collection periodicity supported by the data collection device may be a collection periodicity that can be used when the data collection device collects the data of the target indicator.

The data attribute may be for describing a physical meaning of the data that can be collected by the data collection device, a format of the data that can be collected by the data collection device, precision of the data that can be collected by the data collection device, and a value range of the data that can be collected by the data collection device. For example, the physical meaning of the data may be a temperature or traffic. The format of the data may be an integer, a floating-point number, or the like. The precision of the data may be 0.001, 0.01, or the like. The value range of the data may be a value size range. For example, the value range of the data is [20 to 1000]. The data attribute may alternatively be a data bit width supported by the data collection device. For example, a data size supported by the data collection device is 32 bits. Both the collection frequency and the collection periodicity supported by the data collection device may represent the collection interval.

The capability information of the data receiving device indicates at least one of the following: a data attribute supported by the data receiving device, a data reporting frequency supported by the data receiving device, and a data reporting periodicity supported by the data receiving device. For an explanation of the data attribute, refer to the foregoing descriptions. Details are not described herein again. The reporting frequency supported by the data receiving device is a data receiving frequency that can be supported by the data receiving device. The reporting periodicity supported by the data receiving device is a data receiving periodicity that can be supported by the data receiving device.

The data specification requirement of the data analysis device includes data precision of a service requirement.

In a specific implementation, the controller may determine the data collection policy based on an intersection set of the capability information of the data collection device, the data specification requirement of the data analysis device, and the capability information of the data receiving device. The data collection policy includes at least one of the following: a threshold corresponding to the target indicator, the collection interval indication information of the target indicator, a data compression algorithm, a data reporting periodicity (or frequency), and the like. The collection interval indication information of the target indicator may be the plurality of collection periodicities or the plurality of collection frequencies. The collection periodicity or the collection frequency may represent the collection interval. The data reporting periodicity is a periodicity at which the data collection device reports the data of the target indicator, and the data reporting periodicity is the same as or different from the collection periodicity. The data reporting frequency is a frequency at which the data collection device reports the data of the target indicator. The data reporting frequency is the same as or different from the collection frequency. The data compression algorithm is for compressing the data collected by the data collection device, and the data collection device may send compressed data to the data receiving device.

For example, the collection periodicity represents the collection interval. It is assumed that the collection periodicity is the same as the data reporting periodicity, a minimum collection periodicity supported by the data collection device is 10 s, and a minimum data receiving periodicity supported by the data receiving device is 20 s. In this case, it is determined that a minimum collection periodicity in the data collection policy is 20 s. For example, the data collection policy includes a collection periodicity of 20 s and a collection periodicity of 30 s. If the data collection device supports 32-bit data, the data receiving device supports 64-bit data, and the data analysis device supports 16-bit data, it is determined that the data size in the data collection policy is 16 bits.

Further, the controller may further deliver the data collection policy to the data collection device, and the data collection device may collect the data of the target indicator based on the data collection policy.

602: The data collection device obtains the collection interval indication information, and determines a use rule of the collection interval.

Specifically, the data collection device receives and obtains the data collection policy sent by the controller, where the data collection policy includes the collection interval indication information.

Optionally, the data collection policy includes the threshold corresponding to the target indicator. Different collection frequencies may be determined by using the threshold corresponding to the indicator. In this embodiment of this application, there may be one or more thresholds corresponding to the target indicator. For example, refer to FIG. 3. A collection frequency set includes $f_1$ and $f_2$, and $f_1$ and $f_2$ may be indicated by using a threshold. For example, the threshold corresponding to the target indicator is S. $f_1$ is used when the data of the target indicator is less than the threshold S, and $f_2$ is used when the data of the target indicator is greater than the threshold.

Alternatively, refer to FIG. 4. A collection frequency set includes collection frequencies $f_1$, $f_2$, and $f_3$, and $f_1$, $f_2$, and $f_3$ may be indicated by using two different thresholds K1 and K2. $f_1$ is used when the data of the target indicator is less than the threshold K1, $f_2$ is used when the data of the target indicator is greater than or equal to the threshold K1 and less than or equal to the threshold K2, and $f_3$ is used when the data of the target indicator is greater than the threshold K2. $f_1$ is different from $f_2$, and $f_2$ is different from $f_3$.

In a specific implementation, the data collection device may determine the use rule of the collection interval based on a relationship between performance represented by the target indicator and the data of the target indicator. The use rule indicates, for example, a collection interval used when the data of the target indicator is greater than the threshold and a collection interval used when the data of the target indicator is less than the threshold.

For example, the performance represented by the target indicator is negatively correlated with a size of the data of the target indicator. In other words, larger data of the target indicator indicates poorer performance represented by the target indicator. On the contrary, smaller data of the target indicator indicates better performance represented by the target indicator. For example, the target indicator is a transmission delay, and the transmission delay may represent transmission performance of a communication link. A larger transmission delay indicates poorer transmission performance of the communication link, and a smaller transmission delay indicates better transmission performance of the communication link.

Alternatively, the performance represented by the target indicator is positively correlated with a size of the data of the target indicator. In other words, larger data of the target indicator indicates better performance represented by the target indicator. On the contrary, smaller data of the target indicator indicates poorer performance represented by the target indicator. For example, the target indicator is a throughput of a device, and the throughput may represent a rate at which the device receives and forwards data. A larger throughput indicates better communication performance of the device, and a smaller throughput indicates poorer communication performance of the device.

In this embodiment of this application, the data collected by the data collection device can satisfy a service requirement. To better implement a service, more data that contributes more to the service may be collected. Using an anomaly detection-type service as an example, data with poor indicator performance needs to be paid more attention to. When the performance represented by the data of the target indicator is poorer, a smaller collection interval is used to collect more data. If the performance represented by the target indicator is negatively correlated with the size of the data of the target indicator, larger data of the indicator indicates poorer performance represented by the indicator. Therefore, more large data of the target indicator may be collected. In other words, larger data of the target indicator indicates a smaller collection interval. If the performance represented by the target indicator is positively correlated with the size of the data of the target indicator, smaller data of the indicator indicates poorer performance represented by the indicator. Therefore, more small data of target indicator may be collected. In other words, smaller data of the target indicator indicates a smaller collection interval.

In this embodiment of this application, that the use rule of the collection interval is determined with reference to the performance represented by the target indicator and the threshold corresponding to the target indicator specifically includes the following cases.

In a first case, the performance represented by the target indicator is negatively correlated with the size of the data of the target indicator. Larger data of the indicator indicates poorer performance represented by the target indicator, and a smaller collection interval is used.

Figure 7:
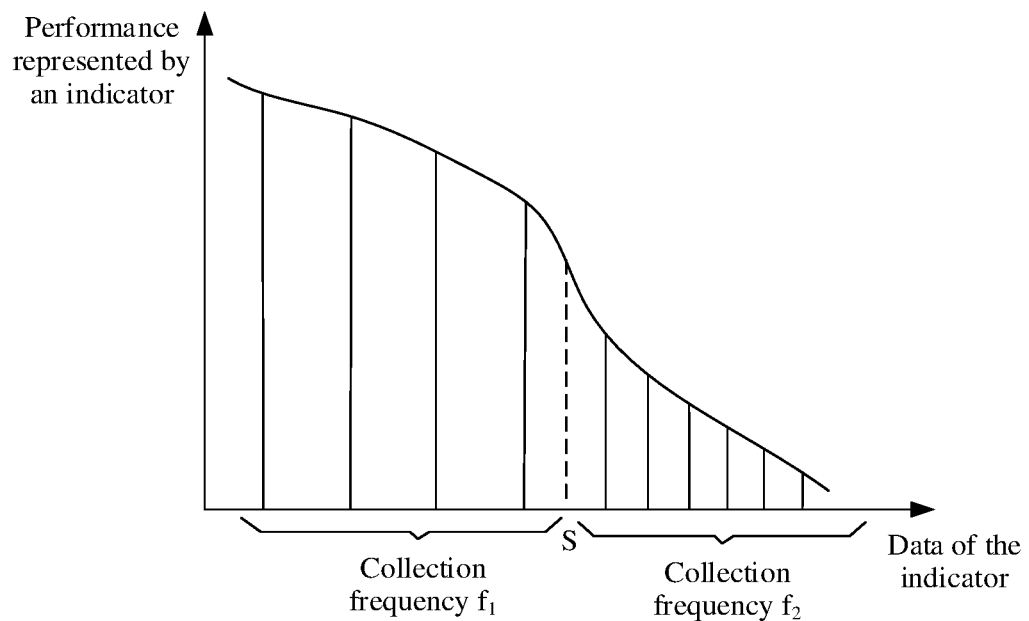
FIG. 7 is a schematic diagram of a use rule of a collection interval according to an embodiment of this application.

For example, the target indicator corresponds only to one threshold S. Collection frequencies $f_1$ and $f_2$ may be for representing collection intervals, where $f_1$ is less than $f_2$. In other words, a collection interval (which is denoted as a first interval) represented by $f_1$ is larger than a collection interval (which is denoted as a second interval) represented by $f_2$. Refer to FIG. 7. When the data of the target indicator is less than the threshold S corresponding to the indicator, the lower collection frequency $f_1$ is used, that is, the larger first interval is used, and a data collection amount is small. When the data of the target indicator is greater than the threshold S corresponding to the indicator, the higher collection frequency $f_2$ is used, that is, the smaller second interval is used, and a data collection amount is large.

When the data of the target indicator is equal to the threshold S, the first interval or the second interval may be used. Details are not described in this embodiment of this application.

Figure 8:
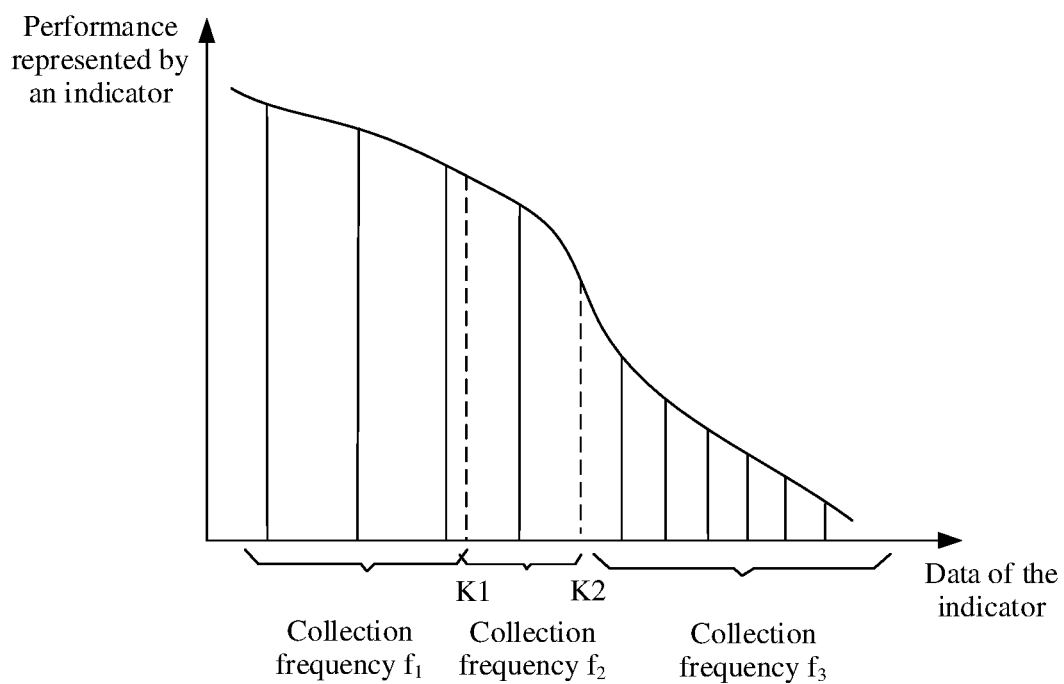
FIG. 8 is another schematic diagram of a use rule of a collection interval according to an embodiment of this application.

For example, the target indicator corresponds to two thresholds K1 and K2. Collection frequencies $f_1$, $f_2$, and $f_3$ may be for representing collection intervals, where $f_1$ is less than $f_2$, and $f_2$ is less than $f_3$. In other words, a collection interval (which is denoted as a first interval) represented by $f_1$ is larger than a collection interval (which is denoted as a second interval) represented by $f_2$, and the collection interval represented by $f_2$ is larger than a collection interval (which is denoted as a third interval) represented by $f_3$. Refer to FIG. 8. When the data of the target indicator is less than the threshold K1 corresponding to the indicator, the lower collection frequency $f_1$ is used, that is, the larger first interval is used, and a data collection amount is small. When the data of the target indicator is greater than the threshold K1 corresponding to the indicator and less than K2, the collection frequency $f_2$ is used, that is, the intermediate second interval is used, and a data collection amount is moderate. When the data of the target indicator is greater than the threshold K2 corresponding to the indicator, the higher collection frequency $f_3$ is used, that is, the smallest third interval is used, and a data collection amount is large.

When the data of the target indicator is equal to the threshold K1, the first interval or the second interval is used. When the data of the target indicator is equal to the threshold K2, the second interval or the third interval is used.

In a possible implementation, the target indicator corresponds to more than two thresholds, where a largest threshold is K2, and a smallest threshold is K1. When the data of the target indicator is less than K1, a first interval is used. When the data of the target indicator is greater than K2, a third interval is used.

In a second case, the performance represented by the target indicator is positively correlated with the size of the data of the target indicator.

For example, the target indicator corresponds only to one threshold S. Collection frequencies $f_1$ and $f_2$ may be for representing collection intervals, where $f_1$ is greater than $f_2$. In other words, a collection interval (which is denoted as a first interval) represented by $f_1$ is smaller than a collection interval (which is denoted as a second interval) represented by $f_2$.

Figure 9:
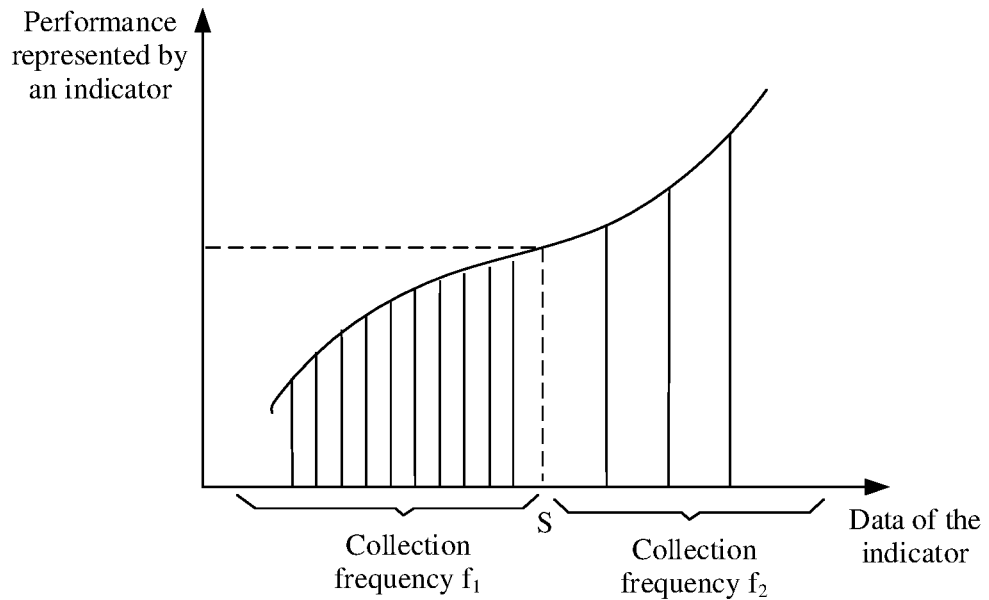
FIG. 9 is another schematic diagram of a use rule of a collection interval according to an embodiment of this application.

Refer to FIG. 9. When the data of the target indicator is less than the threshold S corresponding to the indicator, the higher collection frequency $f_1$ is used, that is, the smaller first interval is used, and a data collection amount is large. When the data of the target indicator is greater than the threshold S corresponding to the indicator, the lower collection frequency $f_2$ is used, that is, the larger second interval is used, and a data collection amount is small. When the data of the target indicator is equal to the threshold S, the first interval or the second interval is used. Details are not described in this embodiment of this application.

For example, the indicator corresponds to thresholds K1 and K2. Collection frequencies $f_1$, $f_2$, and $f_3$ may be for representing collection intervals, where $f_1$ is greater than $f_2$, and $f_2$ is greater than $f_3$. In other words, a collection interval (which is denoted as a first interval) represented by $f_1$ is smaller than a collection interval (which is denoted as a second interval) represented by $f_2$, and the collection interval represented by $f_2$ is smaller than a collection interval (which is denoted as a third interval) represented by $f_3$.

Figure 10:
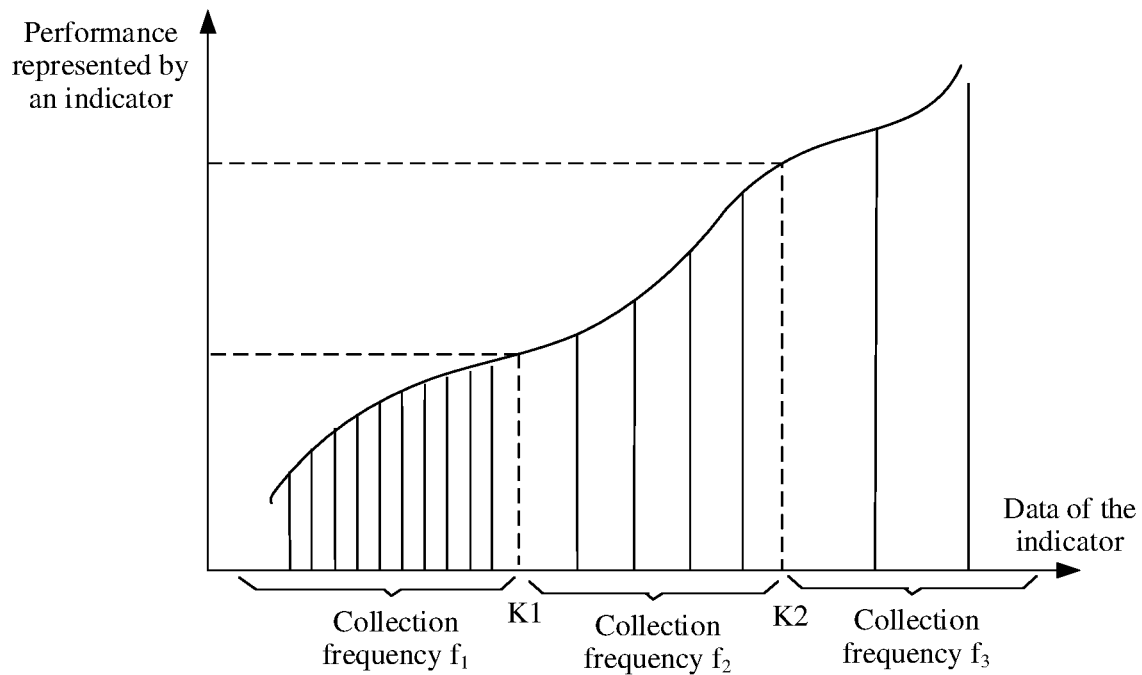
FIG. 10 is another schematic diagram of a use rule of a collection interval according to an embodiment of this application.

Refer to FIG. 10. When the data of the target indicator is less than the threshold K1 corresponding to the indicator, the higher collection frequency $f_1$ is used, that is, the smaller first interval is used, and a data collection amount is large. When the data of the target indicator is greater than the threshold K1 corresponding to the indicator and less than K2, the collection frequency $f_2$ is used (where $f_2$ is less than $f_1$), that is, the intermediate second interval is used, and a data collection amount is moderate. When the data of the target indicator is greater than K2, the collection frequency $f_3$ is used, that is, the larger third interval is used, and a data collection amount is small.

When the data of the target indicator is equal to the threshold K1, the first interval or the second interval is used. When the data of the target indicator is equal to the threshold K2, the second interval or the third interval is used.

In a possible implementation, the target indicator corresponds to more than two thresholds, where a largest threshold is K2, and a smallest threshold is K1. When the data of the target indicator is less than K1, a first interval is used. When the data of the target indicator is greater than K2, a third interval is used.

Figure 11:
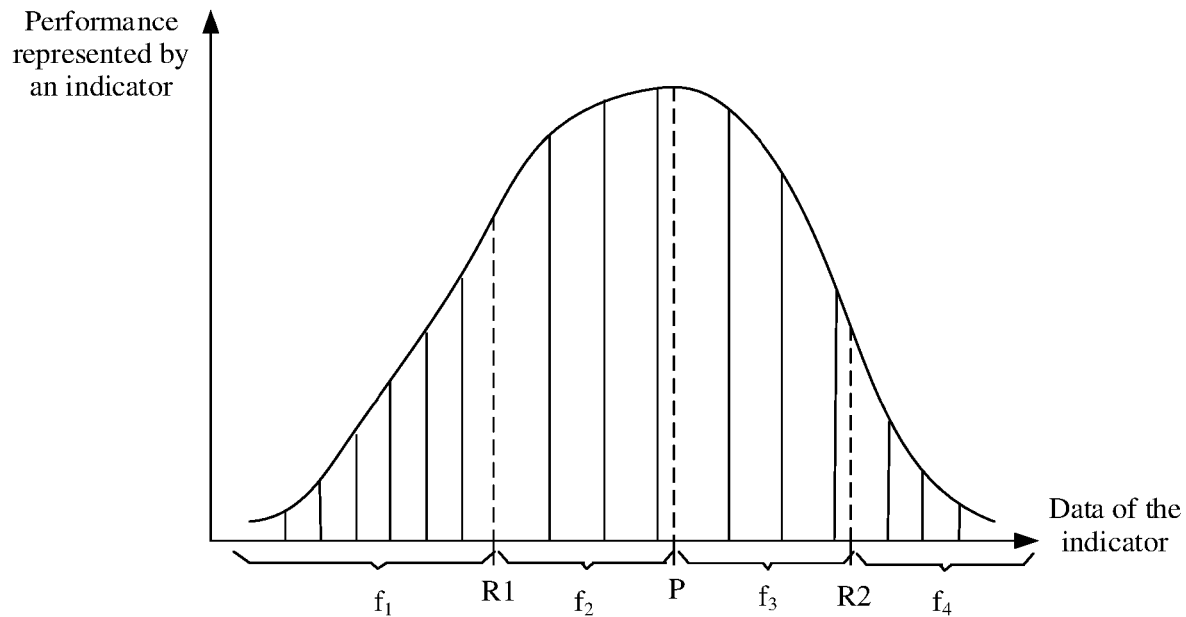
FIG. 11 is another schematic diagram of a use rule of a collection interval according to an embodiment of this application.

In a third case, refer to FIG. 11. When the data of the target indicator is greater than a first value P and less than a second value Q, the performance represented by the target indicator reaches a peak value. Specifically, when the data of the target indicator is less than P, the performance represented by the target indicator is positively correlated with the size of the data of the target indicator. When the data of the target indicator is greater than Q, the performance represented by the target indicator is negatively correlated with the size of the data of the target indicator. It should be noted that the first value P and the second value Q may be the same or may be different.

For example, the first value and the second value are the same, and are both denoted as P. When the data of the target indicator is less than P, smaller data of the target indicator indicates poorer performance represented by the target indicator. Refer to FIG. 11. When the data of the target indicator is less than a threshold R1, a collection frequency $f_1$ is used.

When the data of the target indicator is greater than R1, a collection frequency $f_2$ is used. $f_1$ is greater than $f_2$. In other words, a first interval represented by $f_1$ is smaller than a second interval represented by $f_2$.

When the data of the target indicator is greater than P, larger data of the target indicator indicates poorer performance represented by the target indicator. Refer to FIG. 9. When the data of the target indicator is less than a threshold R2, a collection frequency $f_3$ is used. When the data of the target indicator is greater than R2, a collection frequency $f_4$ is used. $f_4$ may be greater than $f_3$. In other words, a fourth interval represented by $f_4$ is smaller than a third interval represented by $f_3$.

It should be noted that $f_2$ and $f_3$ may be the same or different. In other words, the second interval and the third interval may be the same or different. $f_1$ and $f_4$ may be the same or different. In other words, the first interval and the fourth interval may be the same or different.

Figure 12:
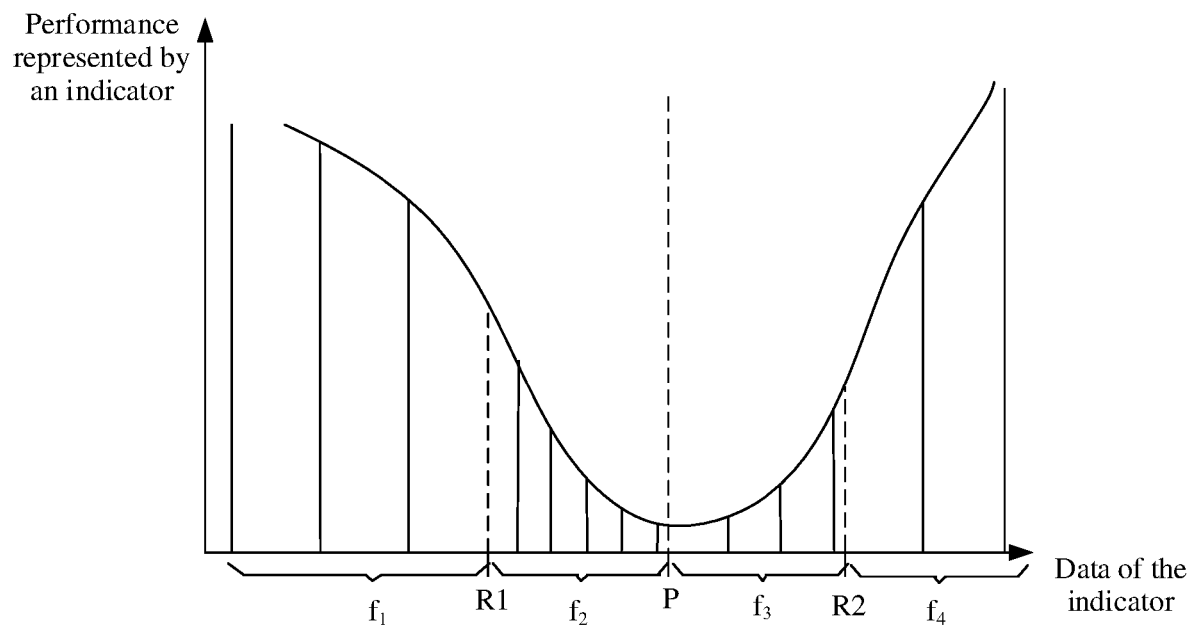
FIG. 12 is another schematic diagram of a use rule of a collection interval according to an embodiment of this application.

In a fourth case, refer to FIG. 12. When the data of the target indicator is greater than a first value P and less than a second value Q, the performance represented by the target indicator reaches a valley. Specifically, when the data of the target indicator is less than P, the performance represented by the target indicator is negatively correlated with the size of the data of the target indicator. When the data of the target indicator is greater than Q, the performance represented by the target indicator is positively correlated with the size of the data of the target indicator. It should be noted that the first value P and the second value Q may be the same or may be different.

For example, the first value and the second value are the same, and are both denoted as P. When the data of the target indicator is less than P, smaller data of the target indicator indicates better performance represented by the target indicator. Refer to FIG. 12. When the data of the target indicator is less than a threshold R1, a collection frequency $f_1$ is used. When the data of the target indicator is greater than the threshold R1 and less than P, a collection frequency $f_2$ is used. $f_2$ is greater than $f_1$, and a second interval represented by $f_2$ is smaller than a first interval represented by $f_1$.

When the data of the target indicator is greater than P, larger data of the target indicator indicates better performance represented by the target indicator. Refer to FIG. 12. When the data of the target indicator is less than a threshold R2 and greater than P, a collection frequency $f_3$ is used. When the data of the target indicator is greater than the threshold R2, a collection frequency $f_4$ is used. $f_3$ may be greater than $f_4$, and a third interval represented by $f_3$ is smaller than a fourth interval represented by $f_4$.

It should be noted that $f_2$ and $f_3$ may be the same or different, and the second interval and the third interval may be the same or different. $f_1$ and $f_4$ may be the same or different, and the first interval and the fourth interval may be the same or different.

603: The data collection device determines, based on the threshold corresponding to the target indicator, a collection interval for to-be-collected data of the target indicator.

In a specific implementation, the data collection device determines a collection frequency for the to-be-collected data of the target indicator based on a value relationship between collected data of the target indicator and the threshold. For example, the collection device collects data x of the target indicator at a moment T1, and may determine, based on a value relationship between x and the threshold, a collection frequency in a time period after the moment T1, until a collection frequency is determined again based on a value relationship between other collected data and the threshold.

When performing step 603, the data collection device may first collect data by using a default collection frequency, and then determine, based on a value relationship between the data and the threshold, the collection interval for subsequent data collection. For example, it is assumed that the target indicator corresponds to a first threshold and a second threshold, and a use rule of the collection frequency is: when the data of the indicator is less than the first threshold, a collection frequency $f_1$ is used; when the data of the indicator is greater than the first threshold and less than the second threshold, a collection frequency $f_2$ is used; and when the data of the indicator is greater than the second threshold, a collection frequency $f_3$ is used. When step 603 is performed, the data of the target indicator may be collected by using $f_2$.

Alternatively, when step 603 is performed, the data of the target indicator is directly collected, and then the collection interval for subsequent data collection is determined based on a value relationship between collected data and the threshold.

In a possible implementation, the target indicator corresponds only to one threshold. Specifically, if the collected data of the target indicator is less than the threshold, a first interval is used. If the collected data of the target indicator is greater than the threshold, a second interval is used as the collection frequency. The first interval is different from the second interval. The first interval is represented by a first frequency or a first periodicity included in the collection interval indication information of the data. The second interval is represented by a second frequency or a second periodicity included in the collection interval indication information.

For example, if data x collected by the data collection device at a moment T1 is less than the threshold, the data of the target indicator may be collected by using the second frequency after the moment T1. If data y collected by the data collection device at a moment T2 is greater than the threshold, the data of the target indicator may be collected by using the first frequency after the moment T2.

In another possible implementation, the target indicator corresponds to two different thresholds, which are respectively a first threshold and a second threshold, and the second threshold is greater than the first threshold.

Specifically, if the collected data of the target indicator is less than the first threshold, a first interval is used. If the collected data of the target indicator is greater than the first threshold and less than the second threshold, a second interval is used. If the collected data of the target indicator is greater than the second threshold, a third interval is used.

When the collected data of the target indicator is equal to the first threshold, the first interval or the second interval is used. When the collected data of the target indicator is equal to the second threshold, the second interval or the third interval is used.

In this embodiment of this application, the first interval is different from the second interval, the second interval is different from the third interval, and the first interval may be the same as or different from the third interval. The first interval is represented by a first frequency or a first periodicity included in the collection interval indication information of the data. The second interval is represented by a second frequency or a second periodicity included in the collection interval indication information. The third interval is represented by a third frequency or a third periodicity included in the collection interval indication information.

It should be noted that the data collection device may determine the collection frequency for the to-be-collected data of the target indicator based on a value relationship between the threshold and data that is collected at a current moment or that is newly collected before the current moment and that is of the target indicator. For example, if data x collected by the data collection device at the current moment (for example, a moment T1) is less than the threshold, the data collection device may collect the to-be-collected data of the target indicator by using a second frequency. If data y collected by the data collection device at the current moment is greater than the threshold, the data collection device may collect the to-be-collected data of the target indicator by using a first frequency.

Alternatively, the data collection device may determine the collection frequency for the to-be-collected data of the target indicator based on a value relationship between the threshold and a statistical value (for example, an average value or a weighted average value) of data that is of the target indicator and that is collected for a plurality of times in a time window that uses a current moment as a deadline.

Figure 13:
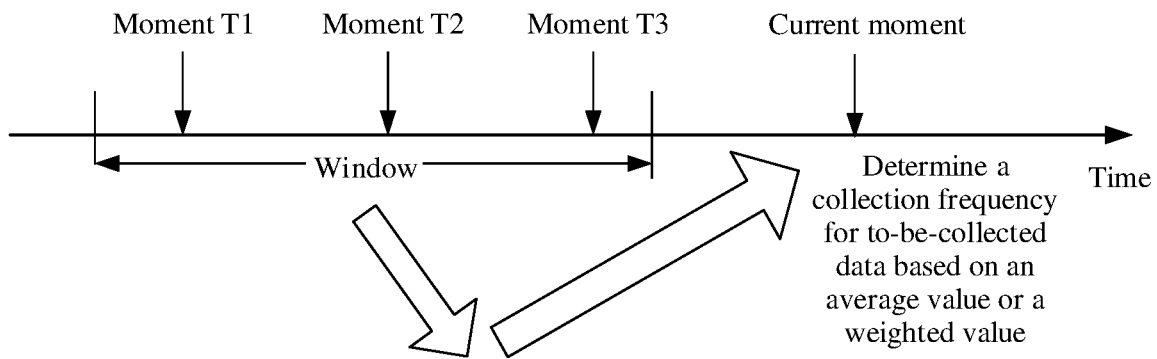
FIG. 13 is another schematic diagram of a use rule of a collection interval according to an embodiment of this application.

For example, refer to FIG. 13. A moment T1, a moment T2, and a moment T3 in a window are three collection moments. T3 is a moment at which data is collected most recently before a current moment. Data collected at the moment T1 is x, data collected at the moment T2 is y, and data collected at the moment T3 is z. An average value $[(x+y+z)/3]$ of x, y, and z may be calculated, and the collection frequency for the to-be-collected data of the target indicator is determined based on a value relationship between the average value $[(x+y+z)/3]$ and the threshold of the target indicator.

Alternatively, a weighted value $[(x^*w_1+y^*w_2+z^*w_3)/3]$ of x, y, and z may be calculated, where $w_1$, $w_2$, and $w_3$ are weight coefficients of the data that is of the target indicator and that is collected at the moments T1, T2, and T3 respectively. In a possible implementation, a moment closer to the current moment indicates a larger weight coefficient of data collected at the moment. For example, $w_1<w_2<w_3$.

The current moment is a moment at which step 603 is performed.

Further, the data collection device determines the collection frequency for the to-be-collected data of the target indicator based on a value relationship between the weighted value $[(x^*w_1+y^*w_2+z^*w_3)/3]$ and the threshold of the target indicator.

604: The data collection device collects data of the target indicator based on the collection frequency.

In this embodiment of the present invention, the data collection device may collect performance indicator data of the data collection device, or may collect performance indicator data of another device that is connected to the data collection device. For example, the data collection device may be an OLT in a passive optical network (PON). The OLT may collect performance indicator data such as a transmit optical power and a bias current of the OLT and report the performance indicator data to the data analysis device, or may collect performance indicator data such as a transmit optical power and a bias current of an ONU connected to the OLT and report the performance indicator data to the data analysis device. When collecting the performance indicator data of the ONU, the OLT may specifically collect the performance indicator data of the ONU by using an optical network terminal management and control interface (OMCI).

Optionally, the method shown in FIG. 6 further includes: After step 603, the data collection device sends the collected data of the target indicator to the data receiving device.

Specifically, the data collection device may send the collected data of the target indicator to the data receiving device based on the data reporting periodicity. The reporting periodicity may be the same as the collection periodicity for the indicator. In other words, if the data collection device collects data once, the data collection device reports the data to the data receiving device once. Alternatively, the reporting periodicity may be different from the collection periodicity for the indicator, and may be specifically an integer multiple of the collection periodicity. After data is collected for a plurality of times, the data that is of the target indicator and that is collected for the plurality of times is uniformly reported.

In a specific implementation, a multiple relationship between the reporting periodicity and the collection periodicity may be fixed. For example, the reporting periodicity is N times the collection periodicity (where N is an integer greater than or equal to 2), and N is a determined value such as 3. After the collection periodicity or the collection frequency is determined in step 603, the corresponding reporting periodicity is correspondingly determined. For example, if the determined collection periodicity is 0.5 s or the determined collection frequency is two times each second, and N is 3, the reporting periodicity is 1.5 s.

In a specific implementation, the reporting periodicity may alternatively be a determined value such as 3 s. In this case, the collection periodicity or the collection frequency determined in step 603 does not affect the reporting periodicity.

Optionally, the data collection policy of the target indicator may alternatively be determined by the data collection device.

In this implementation, the method shown in FIG. 6 does not include step 601. "The data collection device obtains the collection interval indication information" in step 602 may be "A data collection device determines a data collection policy, where the data collection policy includes collection interval indication information".

Specifically, the data collection device may obtain receive-end capability information (which is denoted as receive-end capability information 1), where the receive-end capability information is generated by a control device based on the capability information of the data receiving device and the data specification requirement of the data analysis device. For the capability information of the data receiving device and the data specification requirement of the data analysis device, refer to the foregoing descriptions. Details are not described herein again. For example, the receive-end capability information may indicate a data attribute (for example, a data bit width and data precision), a data reporting frequency (or a periodicity), and the like that are supported by a receive end (for example, the data receiving device or the data analysis device).

In a possible implementation, the data collection device may obtain the receive-end capability information from the controller.

Further, the data collection device may further determine the data collection policy based on the receive-end capability information and the capability information of the data collection device. For information included in the data collection policy, refer to the foregoing descriptions. Details are not described herein again.

The data collection device may collect the data of the target indicator based on the data collection policy. The collection frequency is used as an example. A collection frequency set in the data collection policy determined by the data collection device includes $f_1$ and $f_2$. For example, how to use $f_1$ and $f_2$ may be determined. It is assumed that $f_1$ is a low frequency, $f_2$ is a high frequency, and the performance represented by the target indicator is positively correlated with the size of the data of the target indicator. It may be understood that smaller data of the target indicator is collected by using a high frequency. Therefore, when the collected data of the target indicator is greater than the threshold corresponding to the target indicator, the data of the target indicator may be subsequently collected by using the frequency $f_2$, and the collection interval is a second interval. Alternatively, when the collected data of the target indicator is less than the threshold corresponding to the target indicator, the data of the target indicator may be subsequently collected by using the frequency $f_1$, and the collection interval is a first interval.

Optionally, the method shown in FIG. 6 further includes: After step 603, the data collection device may further perform data amount flow control, that is, adjust an amount of collected and reported data. Specifically, the amount of collected data is dynamically adjusted in the following two manners.

In a first manner, after the collected data is reported to the data receiving device, a data amount adjustment policy is determined based on a feedback of the data analysis device and the data receiving device for the data. The data amount adjustment policy includes increasing or decreasing the amount of collected data. Further, the amount of collected data may be adjusted by adjusting the threshold, or the amount of collected data may be adjusted by adjusting the collection interval indication information.

For example, after the data collection device sends the collected data to the data receiving device, the data receiving device may further obtain an evaluation result based on a resource occupation status (for example, a network-bandwidth occupation status by the reported data, or a storage-space occupation status of the data receiving device by the reported data) of the data receiving device by the reported data. The data receiving device may further feed back the evaluation result to the controller. The evaluation result of the data receiving device includes but is not limited to the following types.

(1) An evaluation result of a utilization rate of a data receiving channel: The data collection device transmits the collected data to the data receiving device by using a network, and the data receiving device may monitor a network-bandwidth utilization status, for example, monitor a network KPI such as a packet loss, a delay, and a bandwidth occupation rate. When the network KPI deteriorates, the data collection amount needs to be reduced, to reduce a data reporting amount and load of the network bandwidth. Alternatively, when the network KPI is good, the data collection amount may be increased.

(2) An evaluation result of a utilization rate of data storage: After receiving the data, the data receiving device may store the data in a RAM or a permanent storage disk. When storage occupation is excessively large, the data collection amount needs to be reduced, to reduce occupied storage space of the data receiving device. If the storage occupation is small, the data collection amount may be increased.

The data receiving device may further forward the data reported by the data collection device to the data analysis device, or convert the data reported by the data collection device and send converted data to the data analysis device.

The data analysis device may evaluate a service requirement satisfaction degree based on the received data. An evaluation result of the service requirement satisfaction degree represents whether the currently collected data satisfies a service requirement. It may be understood that the data analysis device may perform data analysis based on the service requirement. Different service requirements require different collection granularities and data amounts. For example, when the received data is analyzed at a time granularity of a month or a year, an expected collection granularity is low, and a required overall data collection frequency is low. When the received data is analyzed at a time granularity of a minute or an hour, an expected collection granularity is high, a required overall data collection frequency is high, and a corresponding data amount is large. The data analysis device may determine that the currently collected data does not satisfy the service requirement, and feed back the evaluation result to the controller, to indicate that the overall data collection frequency needs to be increased, that is, the data collection amount needs to be increased.

The controller may generate data amount adjustment indication information based on the evaluation result reported by the data collection device and the data analysis device, and send the data amount adjustment indication information to the data collection device. The data amount adjustment indication information may indicate to increase or decrease the data collection amount.

The data collection device receives the data amount adjustment indication information, and may further determine the data amount adjustment policy based on the data amount adjustment indication information, for example, increasing or decreasing the data collection amount.

In a second manner, a data adjustment policy is determined based on a data characteristic of the collected data, and the threshold corresponding to the target indicator is adjusted to adjust the collection frequency.

The data characteristic of the data of the target indicator includes at least one of the following: a data physical characteristic, a data distribution feature, and an evaluation result of a data collection capability. A specific analysis is as follows:

(1) The data physical characteristic represents a physical characteristic of the data collected by the data collection device. For example, the data physical characteristic may be a change speed of the collected data. A collection frequency that matches the data physical characteristic may be determined based on a change frequency of the data, and the collection frequency may be referred to as a collection frequency $f_1$ corresponding to the data physical characteristic.

For example, an optical power generally changes slowly, and a low collection frequency may be used. Network traffic changes fast, and a high collection frequency may be used.

(2) The data collection result evaluation represents impact, on device performance, of collecting, by the data collection device, the data of the target indicator based on the current collection frequency. For example, if the current collection frequency has negative impact on running of the data collection device, the collection frequency needs to be reduced, and a lower collection frequency is used, where "a lower collection frequency" may be referred to as a collection frequency $f_2$ corresponding to the evaluation result of the data collection capability.

(3) An evaluation result of the data distribution feature represents a distribution characteristic of the data that is collected by the data collection device based on the current collection frequency and that is of the target indicator. For example, the collected data satisfies normal distribution, and a high collection frequency may be used in a place where data is densely distributed (for example, near an average value). The collection frequency may be referred to as a collection frequency $f_3$ corresponding to the evaluation result of the data distribution feature.

In a possible implementation, the data collection device calculates a weighted value based on a collection frequency corresponding to each data characteristic and a weight coefficient of each data characteristic, and may further determine the data amount adjustment policy based on the weighted value.

Figure 14:
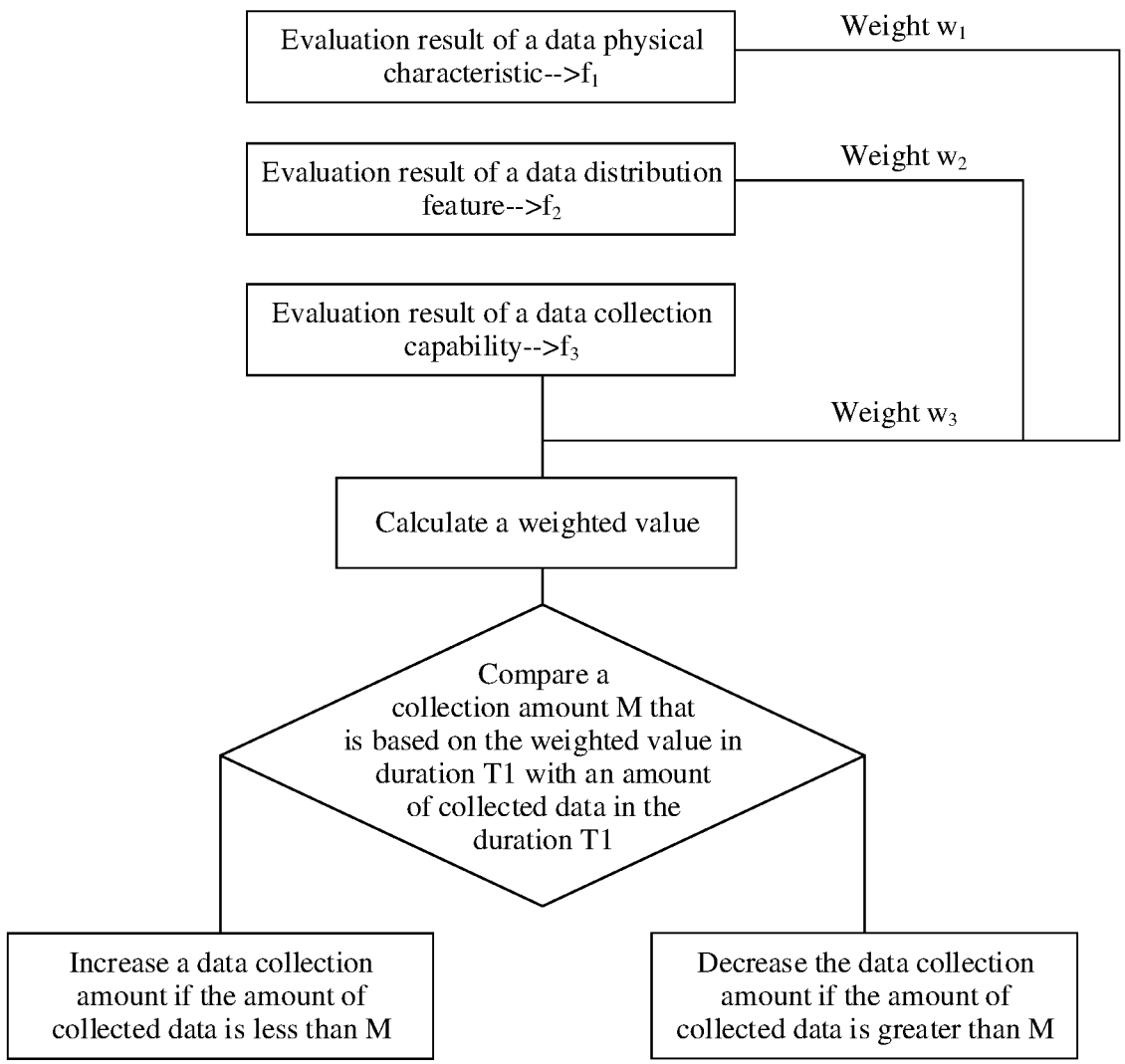
FIG. 14 is a schematic flowchart of determining a data amount adjustment policy according to an embodiment of this application.

For example, refer to FIG. 14. The data collection device obtains, through evaluation, a collection frequency $f_1$ based on the data physical characteristic, where a weight coefficient of the data physical characteristic is $w_1$; obtains, through evaluation, a collection frequency $f_2$ based on the data distribution feature, where a weight coefficient of the data physical characteristic is $w_2$; and obtains, through evaluation, a collection frequency $f_3$ based on the evaluation result of the data collection capability, where a weight coefficient of the data physical characteristic is $w_3$. A weighted value $(f_1*w_1+f_2*w_2+f_3*w_3)$ is calculated. It is assumed that an amount of data that is expected to be collected by using the weighted value $(f_1*w_1+f_2*w_2+f_3*w_3)$ in duration T1 is M. In the same duration, if an amount of data collected by the data collection device is less than M, the data collection amount needs to be increased. If the amount of data collected by the data collection device is greater than M, the data collection amount needs to be decreased.

In another possible implementation, the data collection device calculates a weighted value based on a collection frequency corresponding to each data characteristic, a weight coefficient of each data characteristic, a collection frequency determined by the receive end, and a weight coefficient corresponding to the receive end. The data collection device may further determine a collection frequency adjustment policy based on the weighted value.

The collection frequency determined by the receive end may be determined by a device (for example, the controller) at the receive end by evaluating the received data.

In a possible implementation, an evaluation result of the receive end includes but is not limited to: the evaluation result of the utilization rate of the data receiving channel, the evaluation result of the utilization rate of the data storage, and the evaluation result of the service requirement satisfaction degree. The evaluation result of the utilization rate of the data receiving channel may be a data collection frequency $f_{11}$ evaluated by the data receiving device based on the utilization rate of the data receiving channel. $f_{11}$ is a collection frequency expected by the data receive end. Compared with the current collection frequency, performance of the data receiving device may be improved when $f_{11}$ is used to collect data. The evaluation result of the utilization rate of the data storage may be a data collection frequency $f_{12}$ estimated by the data receiving device based on an occupation status of the storage space. $f_{12}$ is a collection frequency expected by the data receive end. Compared with the current collection frequency, performance of the data receiving device may be improved when $f_{12}$ is used to collect data. The evaluation result of the service requirement satisfaction degree may be a collection frequency $f_{13}$ evaluated by the data analysis device based on the service requirement satisfaction degree. Compared with the current collection frequency, data collected by using $f_{13}$ can better match the service requirement.

The receive end may further calculate, based on the evaluation result of the utilization rate of the data receiving channel, the evaluation result of the utilization rate of the data storage, and the evaluation result of the service requirement satisfaction degree, the data collection frequency expected by the receive end. For example, the controller obtains $f_{11}$ and $f_{12}$ from the data receiving device, and obtains $f_{13}$ from the data analysis device. Further, a weighted value $f_{11}*w_{11}+f_{12}*w_{12}+f_{13}*w_{13}=f_4$ may be further calculated, where $w_{11}$, $w_{12}$, and $w_{13}$ are respectively weight coefficients of the evaluation result of the utilization rate of the data receiving channel, the evaluation result of the utilization rate of the data storage, and the evaluation result of the service requirement satisfaction degree. $f_4$ is the data collection frequency expected by the receive end (or the controller). In this embodiment of this application, the data amount adjustment indication information may be $f_4$.

The device (for example, the controller) at the receive end may send the determined collection frequency $f_4$ to the data collection device. The weight coefficient $w_4$ corresponding to the receive end may be further sent. The data collection device may calculate a collection frequency with reference to $f_1$, $f_2$, $f_3$, and $f_4$ that are obtained by the data collection device through evaluation based on the data characteristic of the collected data. The data collection device determines to increase or decrease the data collection amount based on the collection frequency.

Figure 15:
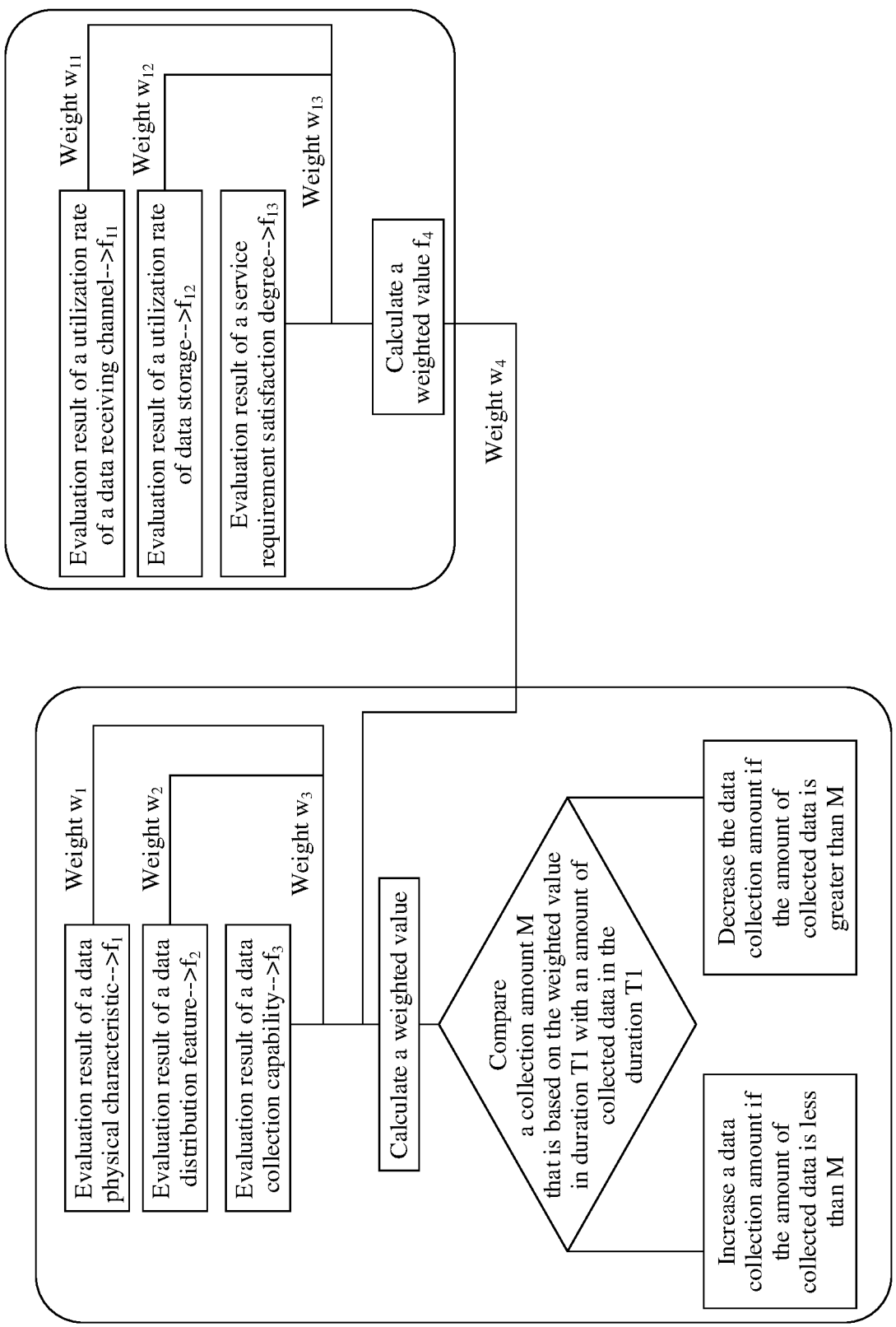
FIG. 15 is another schematic flowchart of determining a data amount adjustment policy according to an embodiment of this application.

For example, refer to FIG. 15. A collection frequency $f_1$ is obtained through evaluation based on the data physical characteristic, where a weight coefficient of the data physical characteristic is $w_1$. A collection frequency $f_2$ is obtained through evaluation based on the data distribution feature, where a weight coefficient of the data physical characteristic is $w_2$. A collection frequency $f_3$ is obtained through evaluation based on the evaluation result of the data collection capability, where a weight coefficient of the data physical characteristic is $w_3$. A collection frequency obtained by the receive end through evaluation based on the data characteristic is $f_4$, where a corresponding weight coefficient is $w_4$. A weighted value $(f_1*w_1+f_2*w_2+f_3*w_3+f_4*w_4)$ is calculated.

It is assumed that an amount of data that is expected to be collected by using the weighted value $(f_1*w_1+f_2*w_2+f_3*w_3+f_4*w_4)$ in duration T2 is N. In the same duration T2, if an amount of data collected by the data collection device is less than N, the data collection amount needs to be increased. If the amount of data collected by the data collection device is greater than N, the data collection amount needs to be decreased.

In a possible implementation, after the collection frequency adjustment policy is determined, the data collection amount may be increased or decreased by adjusting the threshold corresponding to the target indicator. In this manner, the collection frequency or the collection periodicity included in the collection interval indication information does not change. When the threshold corresponding to the target indicator changes, the data collection amount also changes correspondingly.

Figure 16:
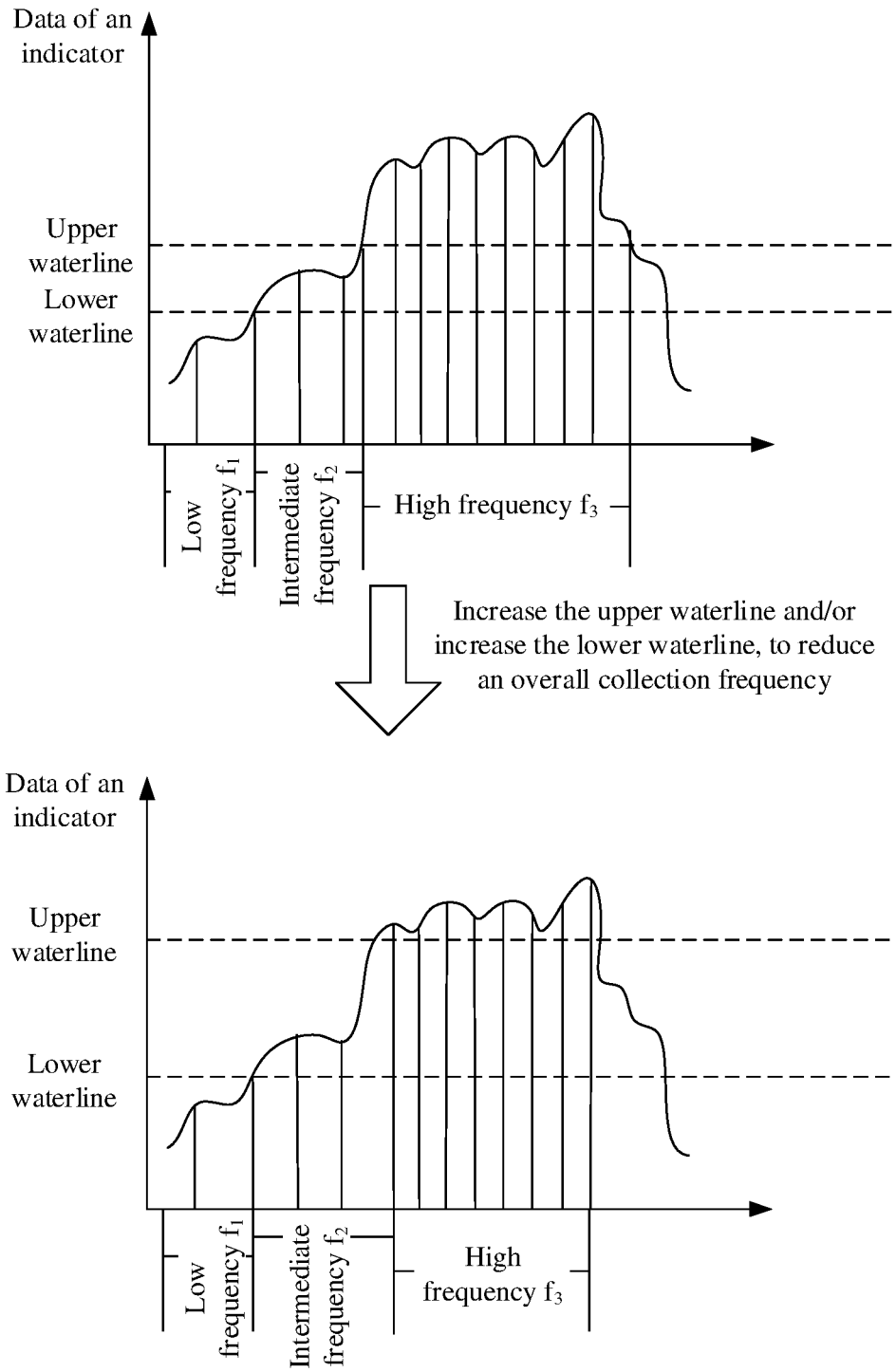
FIG. 16 is a schematic diagram of adjusting a data amount according to an embodiment of this application.

Refer to FIG. 16. Two thresholds (which may be referred to as an upper waterline and a lower waterline) are set. When the collected data is lower than the lower waterline, the data of the target indicator may be subsequently collected by using a low frequency $f_1$. When the collected data is higher than the lower waterline and lower than the upper waterline, the data of the target indicator may be subsequently collected by using an intermediate frequency $f_2$. When the collected data is higher than the upper waterline, the data of the target indicator may be subsequently collected by using a high frequency $f_3$.

Refer to FIG. 16. The upper waterline is increased, so that use of the high frequency $f_3$ may be reduced. As a result, the overall collection frequency of the data collection device is reduced, and the data collection amount is reduced. It can be learned that the data collection amount can be reduced by increasing the upper waterline. Alternatively, the lower waterline is increased, so that use of the low frequency $f_1$ may be reduced. As a result, the overall collection frequency of the data collection device is reduced, and the data collection amount is reduced. It can be learned that the data collection amount can be reduced by increasing the lower waterline.

Figure 17:
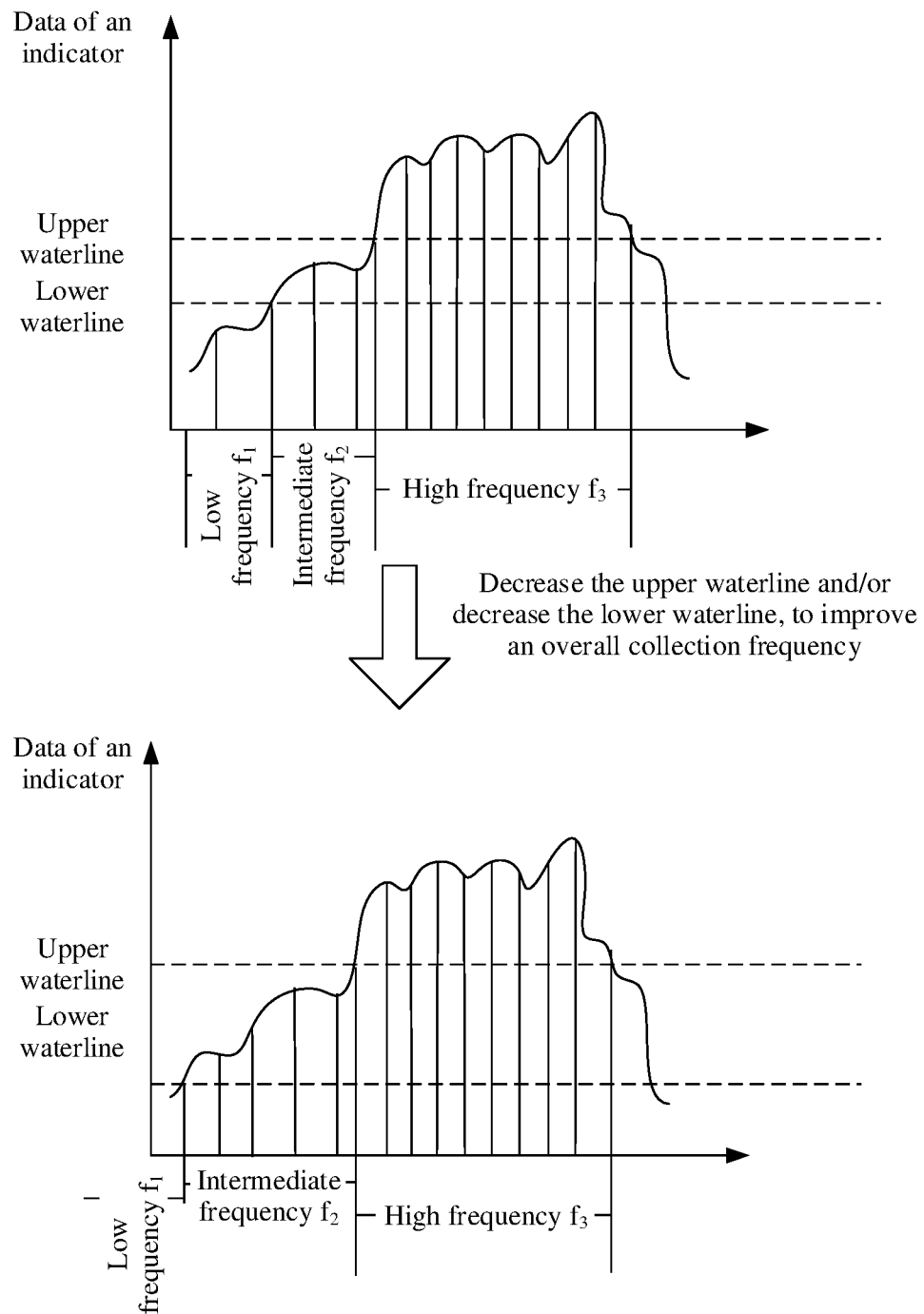
FIG. 17 is a schematic diagram of adjusting another data amount according to an embodiment of this application.

Refer to FIG. 17. The upper waterline is decreased, so that use of the high frequency $f_3$ may be increased. As a result, the overall collection frequency of the data collection device is improved, and the data collection amount is improved. It can be learned that the data collection amount can be improved by decreasing the upper waterline. Alternatively, the lower waterline is decreased, so that use of the intermediate frequency $f_2$ may be increased. As a result, the overall collection frequency of the data collection device is improved, and the data collection amount is improved. It can be learned that the data collection amount can be improved by decreasing the lower waterline.

In the adjustment manners shown in FIG. 16 and FIG. 17, a collection interval available for data collection does not change, and is always a collection interval represented by $f_1$ and $f_2$.

In another possible implementation, the data collection device may alternatively increase the collection frequency (or decrease the collection periodicity) directly, and the available collection interval is reduced, so that the data collection amount is improved. Alternatively, the data collection device may decrease the collection frequency (or increase the collection periodicity) directly, and the available collection interval is improved, so that the data collection amount is reduced.

For example, if a collection frequency set is $f_1$ and $f_2$, and it is determined, according to the foregoing procedure, that the data adjustment policy is increasing the data collection amount, $f_1$ may be increased, $f_2$ may be increased, or both $f_1$ and $f_2$ may be increased.

Optionally, the method shown in FIG. 6 further includes: The data collection device notifies the controller of the collection frequency or collection periodicity representing the current collection interval. The current collection interval is a collection interval obtained through switching based on the value relationship between the collected data and the threshold. For example, it is assumed that the data collection device collects data x of the target indicator based on a collection interval 1 at a moment T1, and determines, based on a value relationship between x and the threshold corresponding to the target indicator, a switched collection interval 2. A collection frequency $f_2$ may be sent to the controller, so that the controller learns a data collection status of the data collection device. The collection frequency $f_2$ represents the collection interval 2.

The data collection device may send, to the controller, the collection frequency or collection periodicity representing the current collection interval, and then the controller may further forward the collection frequency or collection periodicity representing the current collection interval to the data receiving device. Alternatively, the data collection device may directly send, to the data receiving device, the collection frequency or collection periodicity representing the current collection interval.

Optionally, the method shown in FIG. 6 further includes: The data collection device reports the threshold of the target indicator to the controller, and further report the adjusted threshold, so that the controller learns the data collection status of the data collection device.

The controller may further send the threshold corresponding to the target indicator or the adjusted threshold to the data receiving device.

Optionally, the data collection device may send the threshold corresponding to the target indicator or the adjusted threshold to the data receiving device.

Figure 18A:
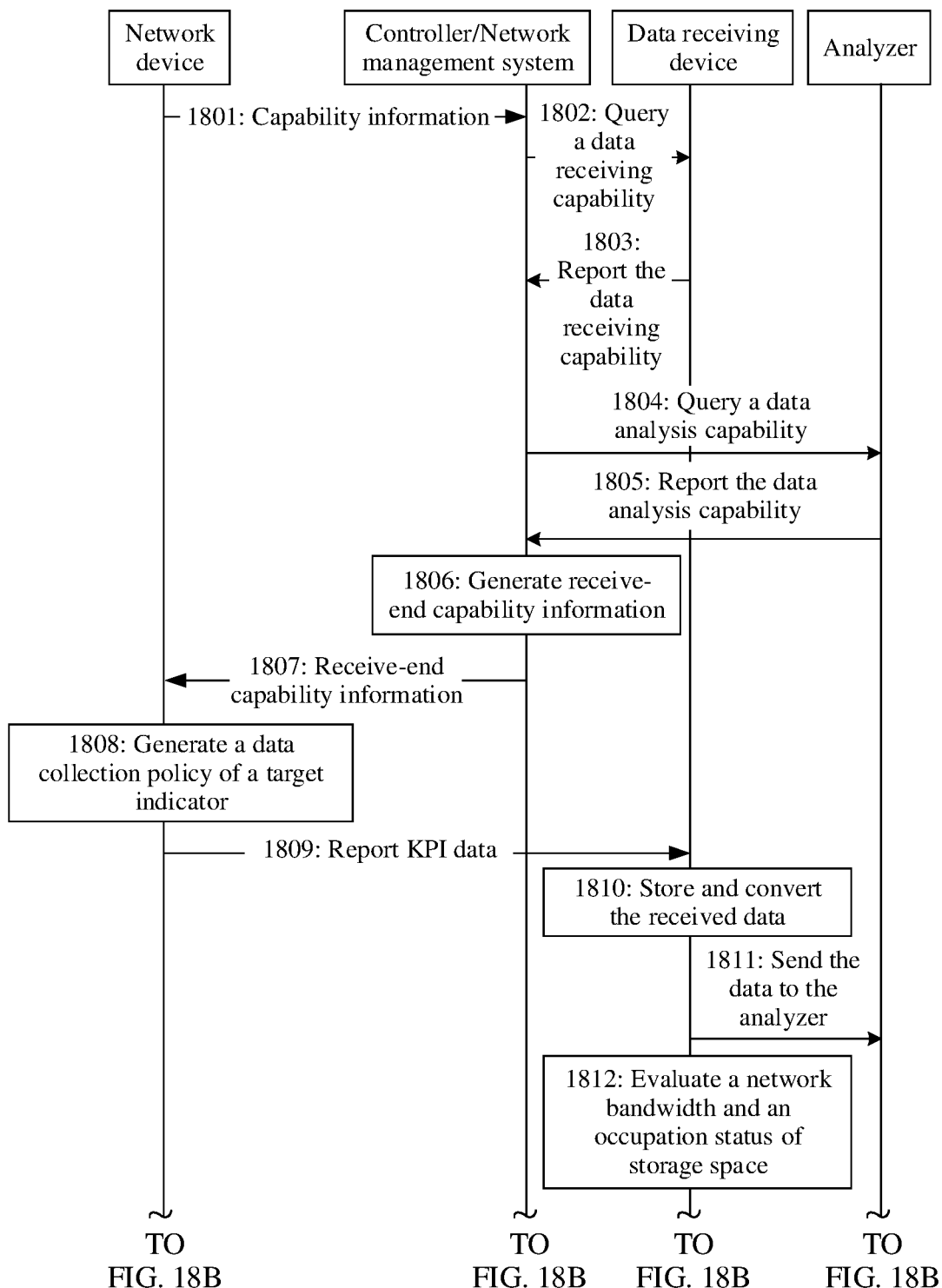
FIGS. 18A and 18B are another schematic flowchart of a data collection method according to an embodiment of this application.
Figure 18B:
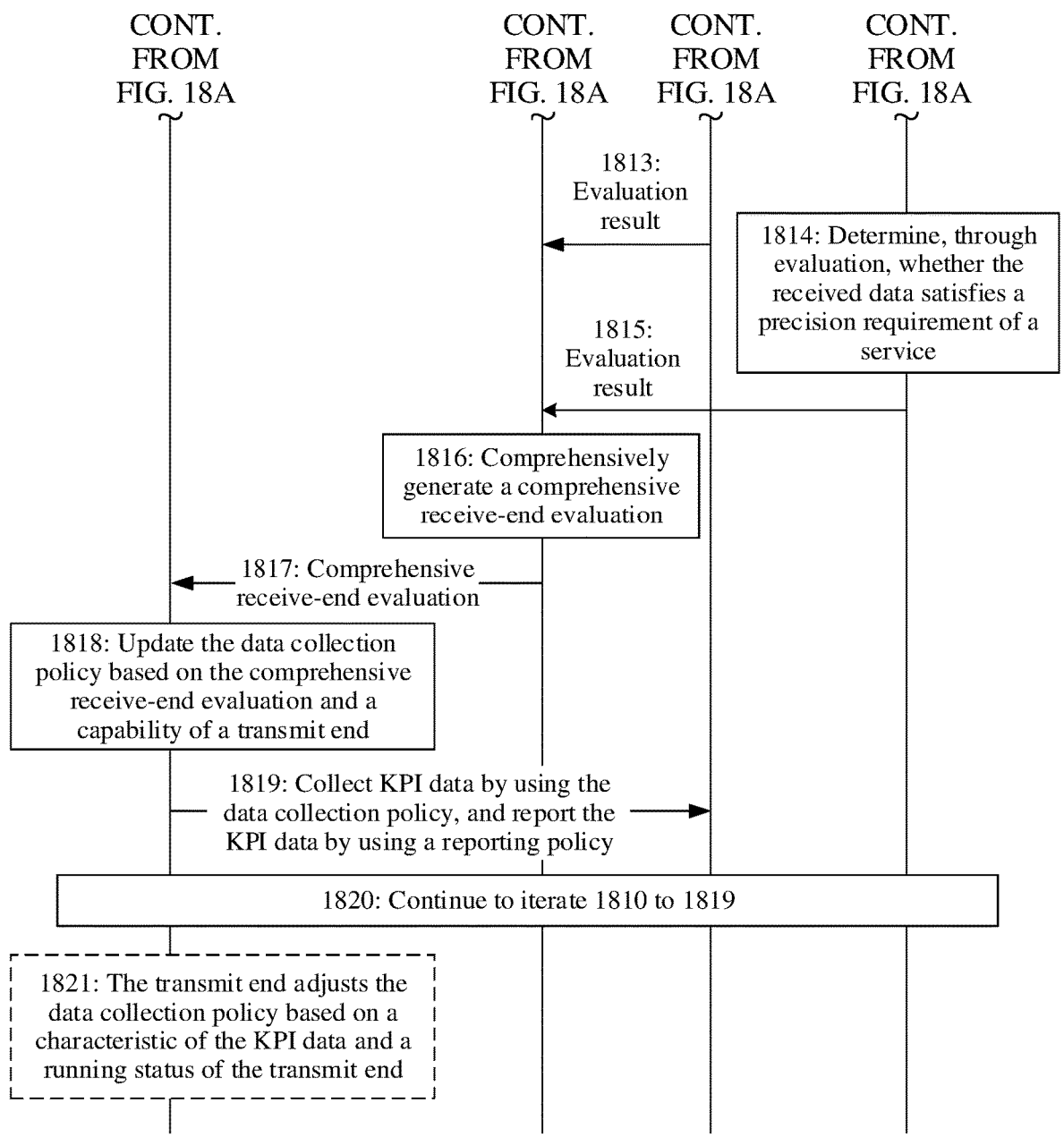

An embodiment of this application further provides a data collection method, including capability negotiation between a transmit end and a receive end, data reporting, data flow control, and the like. The transmit end is a network device, and the receive end includes a controller (a network management system), an analyzer, and a data receiving device. The network device is for collecting KPI data, the data receiving device is for receiving the KPI data collected by the network device, the analyzer is for analyzing the KPI data collected by the network device to implement a service requirement, and the controller is for managing and controlling an entire system. As shown in FIG. 18, the method includes the following steps.

1801: The network device reports capability information to the controller.

The capability information indicates a data attribute, a collection frequency, a collection periodicity, and a data size that are supported by the network device, and may further indicate that the network device supports determining a collection interval based on a threshold.

The network device may further send a handshake signal to the controller, to implement two-way authentication.

1802: The controller queries a data receiving capability of the data receiving device.

1803: The data receiving device reports the data receiving capability to the controller.

Specifically, the data receiving device determines the data receiving capability based on a network bandwidth and CPU performance of the data receiving device.

1804: The controller queries a data analysis capability of the analyzer.

The data analysis capability may be a data specification required by the analyzer. For example, a data collection precision required by the data analysis device may be 1 hour, 15 minutes, 5 minutes, 1 minute, 10 seconds, or 1 second. Different services correspond to different data precision requirements. For example, monthly and yearly network traffic prediction requires only one-hour or even larger-granularity network traffic data. For applications such as network queue scheduling, second-level or even millisecond-level network traffic data precision may be required.

1805: The analyzer reports the data analysis capability to the controller.

1806: The controller generates receive-end capability information based on the data receiving capability and the data analysis capability.

The receive-end capability information may be a data attribute that is allowed to be received, a data reporting periodicity, a supported maximum data value, a supported minimum data value, and the like.

1807: The controller delivers the receive-end capability information to the network device.

In this way, the transmit end and the receive end complete a handshake and capability negotiation process.

1808: The network device comprehensively generates a data collection policy of a target indicator based on a data collection capability of the network device and the receive-end capability information.

Specifically, a capability indicated by the receive-end capability information may be determined, and then an intersection set of the capability and the data collection capability is obtained, to determine the initial data collection policy. The data collection policy may include collection interval indication information and a threshold corresponding to the target indicator.

1809: The network device reports, to the data receiving device, KPI data collected based on the data collection policy.

Specifically, the collection interval indication information includes a plurality of collection frequencies. The network device may determine, based on performance represented by the KPI and values of the collection frequencies, a case in which a collection frequency is used.

For example, the collection interval indication information includes $f_1$ and $f_2$, where $f_1$ is greater than $f_2$. It is assumed that the performance represented by the KPI is positively correlated with a size of the KPI data. In other words, when the KPI data is smaller, a higher collection frequency needs to be used. Therefore, when the collected KPI data is less than the threshold, $f_1$ is used, and a collection interval is small. When the collected KPI data is greater than the threshold, $f_2$ is used, and a collection interval is large.

KPI data comes from various sources, such as a device running temperature measured by a sensor, a fan speed, a received signal strength indicator (RSSI) of a wireless device, a collected CPU, a memory utilization rate, and network interface traffic. Generally, the data is read in a sampling manner. A quantity of sampling times in unit time is a collection periodicity. A larger collection periodicity indicates a larger quantity. The collected data may be represented by different numerical precisions, for example, 8 bits, 16 bits, 32 bits, and 64 bits. A higher numerical precision indicates a larger data amount.

1810: The data receiving device stores and converts the received data.

For example, the received data is compressed and stored.

1811: The data receiving device sends the data to the analyzer.

1812: The data receiving device evaluates a network bandwidth and an occupation status of storage space.

The network bandwidth includes a network bandwidth from the transmit end to the receive end, and may be a network bandwidth for internal transmission. The network bandwidth and the occupation status of the storage space are evaluated, to determine whether an amount of data currently collected (or reported) by network devices is excessively large.

1813: The data receiving device sends an evaluation result to the controller.

1814: The analyzer performs service analysis based on the data, to determine, through evaluation, whether the received data satisfies a precision requirement of a service.

This is also a service objective of data collection and sending, for example, to complete a data visualization task, network traffic trend prediction, and wireless network channel optimization. In addition, the data analysis device evaluates the data, that is, whether the current data satisfies a service requirement, and whether data precision or collection precision needs to be improved (or reduced).

1815: The analyzer sends an evaluation result to the controller.

1816: The controller comprehensively generates a comprehensive receive-end evaluation based on the evaluation results from the data receiving device and the data analysis device.

For example, the evaluation result includes but is not limited to: the evaluation result of the utilization rate of the data receiving channel, the evaluation result of the utilization rate of the data storage, and the evaluation result of the service requirement satisfaction degree. A frequency $f_{11}$ may be evaluated based on the evaluation result of the utilization rate of the data receiving channel, a frequency $f_{12}$ may be evaluated based on the evaluation result of the utilization rate of the data storage, and a frequency $f_{13}$ may be evaluated based on the evaluation result of the service requirement satisfaction degree.

A weighted value $f_{11}*w_{11}+f_{12}*w_{12}+f_{13}*w_{13}=f_4$ may be further calculated, where $w_{11}$, $w_{12}$, and $w_{13}$ are respectively weight coefficients of the evaluation result of the utilization rate of the data receiving channel, the evaluation result of the utilization rate of the data storage, and the evaluation result of the service requirement satisfaction degree. $f_4$ may be a collection frequency of the comprehensive receive-end evaluation.

1817: The controller sends the comprehensive receive-end evaluation to the network device.

1818: The network device updates the data collection policy based on the comprehensive receive-end evaluation and a capability of the transmit end.

The data collection policy is updated to adjust the data collection amount. Updating the data collection policy may be updating the data collection frequency, updating the data collection periodicity, or adjusting the threshold corresponding to the indicator.

For example, the network device obtains, through evaluation, a collection frequency $f_1$ based on the data physical characteristic, where a weight coefficient of the data physical characteristic is $w_1$; obtains, through evaluation, a collection frequency $f_2$ based on the data distribution feature, where a weight coefficient of the data physical characteristic is $w_2$; and obtains, through evaluation, a collection frequency $f_3$ based on the evaluation result of the data collection capability, where a weight coefficient of the data physical characteristic is $w_3$. A collection frequency obtained by the receive end through evaluation based on the data characteristic is $f_4$, where a corresponding weight coefficient is $w_4$.

It is assumed that an amount of data that is expected to be collected by using the weighted value $(f_1*w_1+f_2*f+f_3*w_3+f_4*w_4)$ in duration T2 is N. In the same duration T2, if an amount of data collected by the data collection device is less than N, the data collection amount needs to be increased. If the amount of data collected by the data collection device is greater than N, the data collection amount needs to be decreased.

For example, if the weighted value is five times each second, an amount of data collected each time is 1 M, and T2 is 3 s, N is 15 M. If an amount of data collected within the latest 3 s before a current moment (namely, a moment at which step 1818 is performed) is 12 M, the data collection amount needs to be increased. Assuming that the amount of data collected within the latest 3 s before the current moment (namely, the moment at which step 1818 is performed) is 17 M, the data collection amount needs to be decreased.

1819: Collect KPI data by using the data collection policy, and report the KPI data by using a reporting policy.

1820: Continue to iterate 1810 to 1819.

Optionally, the method may further include 1821: The transmit end adjusts the data collection policy based on a characteristic of the KPI data and a running status of the transmit end. Step 1821 may alternatively be performed after step 1809 and before step 1801.

For example, a collection frequency $f_1$ is obtained through evaluation based on the data physical characteristic, where a weight coefficient of the data physical characteristic is $w_1$; a collection frequency $f_2$ is obtained through evaluation based on the data distribution feature, where a weight coefficient of the data physical characteristic is $w_2$; and a collection frequency $f_3$ is obtained through evaluation based on the evaluation result of the data collection capability, where a weight coefficient of the data physical characteristic is $w_3$.

It is assumed that an amount of data that is expected to be collected by using the weighted value $(f_1*w_1+f_2*w_2+f_3*w_3)$ in duration T1 is N. In the same duration T1, if an amount of data collected by the data collection device is less than N, the data collection amount needs to be increased. If the amount of data collected by the data collection device is greater than N, the data collection amount needs to be decreased.

For example, if the weighted value is three times each second, an amount of data collected each time is 2 M, and T2 is 2 s, N is 12 M. If an amount of data collected within the latest 3 s before a current moment (namely, a moment at which step 1820 is performed) is 15 M, the data collection amount needs to be decreased. Assuming that the amount of data collected within the latest 3 s before the current moment (namely, the moment at which step 1820 is performed) is 10 M, the data collection amount needs to be increased.

Figure 19:
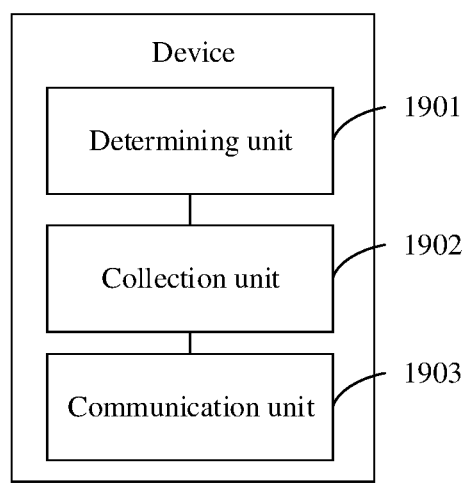
FIG. 19 is a structural block diagram of a device according to an embodiment of this application.

When each functional module that is obtained through division and that corresponds to each function is used, FIG. 19 is a schematic diagram of a possible structure of the device in the foregoing embodiments. The device shown in FIG. 19 may be the data collection device described in embodiments of this application, may be a component that implements the foregoing method in the data collection device, or may be a chip used in the data collection device. The chip may be a system-on-a-chip (SOC), a baseband chip with a communication function, or the like. As shown in FIG. 19, the device includes a determining unit 1901, a collection unit 1902, and a communication unit 1903. The determining unit 1901 may be one or more processors, and the communication unit may be a transceiver or a communication interface.

For example, the determining unit 1901 may be configured to support the data collection device in performing step 602 and step 603, and/or configured to perform another process of the technology described in this specification.

The collection unit 1902 is configured to support the data collection device in performing step 604, and/or configured to perform another process of the technology described in this specification.

The communication unit 1903 is configured to support interaction between the data collection device and another device, for example, support interaction between the data collection device and a controller or a data receiving device, and/or configured to perform another process of the technology described in this specification.

It should be noted that all related content of the steps in the foregoing method embodiments may be cited in function description of corresponding functional modules. Details are not described herein again.

In a possible implementation, the device shown in FIG. 19 may alternatively be a chip used in a computing device. The chip may be a SOC, a baseband chip with a communication function, or the like.

Figure 20:
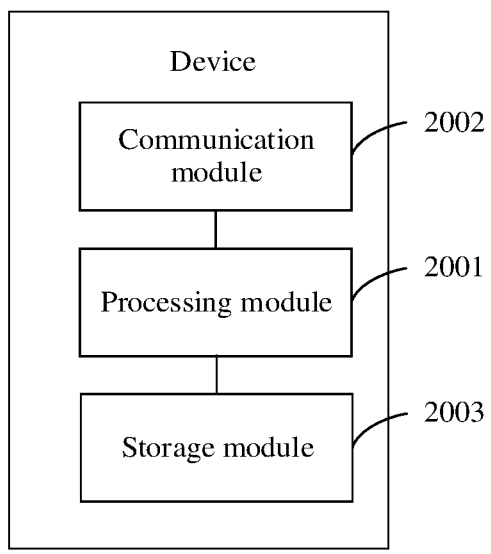
FIG. 20 is a structural block diagram of another device according to an embodiment of this application.

For example, when an integrated unit is used, FIG. 20 is a schematic diagram of a structure of a device according to an embodiment of this application. In FIG. 20, the device includes a processing module 2001 and a communication module 2002. The processing module 2001 is configured to control and manage an action of the device, for example, perform the steps performed by the determining unit 1901 and the collection unit 1902, and/or configured to perform another process of the technology described in this specification. The communication module 2002 is configured to perform the steps performed by the communication unit 1903, and support interaction between the device and another device, for example, interaction with another terminal device. As shown in FIG. 20, the device may further include a storage module 2003, where the storage module 2003 is configured to store program code and data of the device.

When the processing module 2001 is a processor, the communication module 2002 is a transceiver, and the storage module 2003 is a memory, the device is the device shown in FIG. 5.

Figure 21:
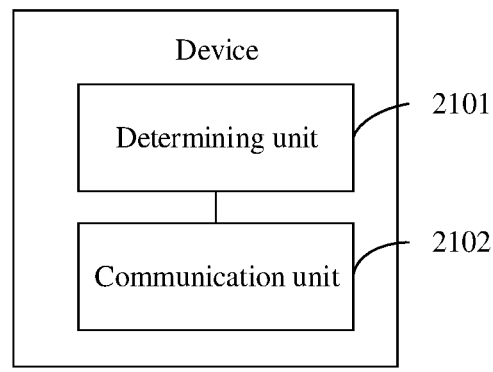
FIG. 21 is a structural block diagram of another device according to an embodiment of this application.

When each functional module that is obtained through division and that corresponds to each function is used, FIG. 21 is a schematic diagram of a possible structure of the device in the foregoing embodiments. The device shown in FIG. 21 may be the controller described in embodiments of this application, may be a component that implements the foregoing method in the controller, or may be a chip used in the controller. The chip may be a SOC, a baseband chip with a communication function, or the like. As shown in FIG. 21, the device includes a determining unit 2101 and a communication unit 2102. The determining unit 2101 may be one or more processors, and the communication unit 2102 may be a transceiver or a communication interface.

For example, the determining unit 2101 may be configured to support the controller in determining a data collection policy, and/or configured to perform another process of the technology described in this specification.

The communication unit 2102 is configured to support interaction between the controller and another device, for example, support interaction between the controller and a data collection device, a data receiving device, or a data analysis device, and/or configured to perform another process of the technology described in this specification.

It should be noted that all related content of the steps in the foregoing method embodiments may be cited in function description of corresponding functional modules. Details are not described herein again.

In a possible implementation, the device shown in FIG. 21 may alternatively be a chip used in a computing device. The chip may be a SOC, a baseband chip with a communication function, or the like.

Figure 22:
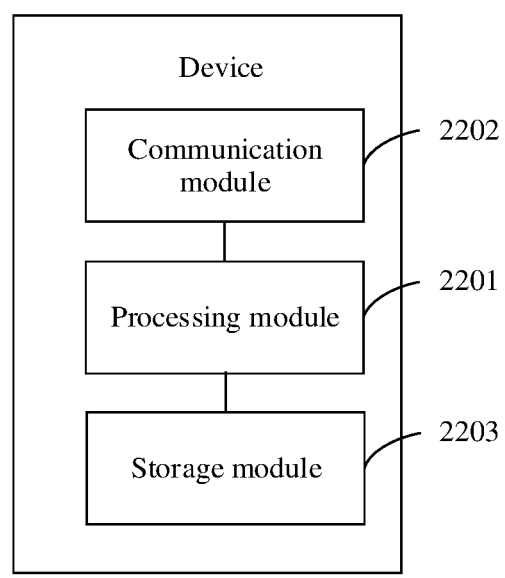
FIG. 22 is a structural block diagram of another device according to an embodiment of this application.

For example, when an integrated unit is used, FIG. 22 is a schematic diagram of a structure of a device according to an embodiment of this application. In FIG. 22, the device includes a processing module 2201 and a communication module 2202. The processing module 2201 is configured to control and manage an action of the device, for example, perform the steps performed by the determining unit 2101, and/or configured to perform another process of the technology described in this specification. The communication module 2202 is configured to perform the steps performed by the communication unit 2102, and support interaction between the device and another device, for example, interaction with another device. As shown in FIG. 22, the device may further include a storage module 2203, where the storage module 2203 is configured to store program code and data of the device.

When the processing module 2201 is a processor, the communication module 2202 is a transceiver, and the storage module 2203 is a memory, the apparatus is the apparatus shown in FIG. 5.

An embodiment of this application further provides a system, including the data collection device shown in FIG. 19 or FIG. 20, and the controller shown in FIG. 21 or FIG. 22. The controller is configured to determine a data collection policy of a target indicator, where the data collection policy includes collection interval indication information, the collection interval indication information is a plurality of collection frequencies or a plurality of collection periodicities, and the plurality of collection frequencies or the plurality of collection periodicities represent a plurality of available collection intervals for collecting data of the target indicator; and send the data collection policy to the data collection device.

The data collection device is configured to determine, based on a threshold corresponding to the target indicator, a collection interval for to-be-collected data of the target indicator from the plurality of available collection intervals; and collect the data of the target indicator based on the collection interval.

Optionally, the system further includes a data receiving device, and the data receiving device is configured to receive the data of the target indicator from the data collection device.

Optionally, the system further includes a data analysis device, and the data analysis device is configured to obtain the data of the target indicator from the data receiving device, to implement a service based on the data of the target indicator.

An embodiment of this application provides a computer-readable storage medium. The computer-readable storage medium stores instructions. The instructions are for performing the method shown in FIG. 6 or FIG. 18.

An embodiment of this application provides a computer program product including instructions. When the computer program product runs on a communication apparatus, the communication apparatus is enabled to perform the method shown in FIG. 6 or FIG. 18.

An embodiment of this application provides a communication apparatus. The communication apparatus stores instructions. When the communication apparatus runs on the communication apparatuses shown in FIG. 5, and FIG. 19 to FIG. 22, the communication apparatus is enabled to perform the method shown in FIG. 6 or FIG. 18. The communication apparatus may be a chip.

The foregoing descriptions about implementations allow a person skilled in the art to understand that, for the purpose of convenient and brief description, division of the foregoing function modules is used as an example for illustration. During actual application, the foregoing functions may be allocated to different function modules and implemented based on a requirement, that is, an inner structure of a communication apparatus is divided into different function modules to implement all or some of the functions described above.

The processor in embodiments of this application may include but is not limited to at least one of the following various computing devices that run software: a CPU, a microprocessor, a digital signal processor (DSP), a microcontroller unit (MCU), an artificial intelligence processor, or the like. Each computing device may include one or more cores configured to perform an operation or processing by executing software instructions. The processor may be an independent semiconductor chip, or may be integrated with another circuit into a semiconductor chip. For example, the processor may form a SoC with another circuit (such as a codec circuit, a hardware acceleration circuit, or various buses and interface circuits). Alternatively, the processor may be integrated into an ASIC as a built-in processor of the ASIC, and the ASIC integrated with the processor may be separately packaged, or may be packaged with another circuit. In addition to the core configured to execute software instructions to perform an operation or processing, the processor may further include a necessary hardware accelerator, for example, a field programmable gate array (FPGA), a a programmable logic device (PLD), or a logic circuit that implements a dedicated logic operation.

The memory in embodiments of this application may include at least one of the following types: a ROM or another type of static storage device that can store static information and instructions, or a RAM or another type of dynamic storage device that can store information and instructions, or may be an EEPROM. In some scenarios, the memory may alternatively be a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed to a computer. However, the memory is not limited thereto.

In this application, "at least one" refers to one or more. "Multiple" refers to two or more than two. A term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

In the several embodiments provided in this application, it should be understood that the disclosed database access apparatus and method may be implemented in other manners. For example, the described database access apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to a conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data collection method, comprising:
   determining, by a data collection device, based on a threshold corresponding to a target indicator, a collection interval for to-be-collected data of the target indicator from a plurality of available collection intervals;
   collecting, by the data collection device, the data of the target indicator based on the collection interval;
   wherein the threshold is adjusted based on a data characteristic; and
   wherein the data characteristic comprises at least one of a data physical characteristic, a data distribution feature, or a data collection result evaluation, wherein the data collection result evaluation represents a degree of impact, on performance of the data collection device, of collecting the data of the target indicator by the data collection device based on a current collection frequency, and wherein the data physical characteristic indicates a change speed of data of the target indicator.

2. The method according to claim 1, wherein the method further comprises:
   adjusting at least one of the plurality of available collection intervals based on the data characteristic.

3. The method according to claim 1, wherein the method further comprises, before the determining, by a data collection device based on a threshold corresponding to a target indicator, a collection interval for to-be-collected data of the target indicator, one of:

receiving, by the data collection device, a data collection policy from a controller, wherein the data collection policy comprises at least one of the threshold or collection interval indication information, wherein the collection interval indication information is a plurality of collection frequencies or a plurality of collection periodicities, and wherein the plurality of collection frequencies or the plurality of collection periodicities represent the plurality of available collection intervals; or determining the data collection policy by:

obtaining receive-end capability information, wherein the receive-end capability information is generated based on capability information of at least one of a data receiving device or a data specification requirement of a data analysis device; and determining, by the data collection device, the data collection policy based on the receive-end capability information, wherein the data collection policy comprises collection interval indication information, wherein the collection interval indication information is a plurality of collection frequencies or a plurality of collection periodicities, and wherein the plurality of collection frequencies or the plurality of collection periodicities represent the plurality of available collection intervals.

4. The method according to claim 3, wherein the data collection device receives the data collection policy from the controller, and wherein the method further comprises, before the receiving, by the data collection device, the data collection policy from the controller:

sending, by the data collection device, capability information of the data collection device to the controller, wherein the capability information of the data collection device indicates at least one of a data attribute supported by the data collection device, a capability of the data collection device to determine a collection interval for data of an indicator based on a threshold of the indicator, a collection frequency supported by the data collection device, or a collection periodicity supported by the data collection device, and wherein the data attribute comprises at least one of a data format, data precision, or a data bit width, wherein the controller determines the data collection policy based on the capability information of the data collection device.

5. The method according to claim 3, wherein the capability information of the data receiving device indicates at least one of a data attribute supported by the data receiving device, a data reporting frequency supported by the data receiving device, or a data reporting periodicity supported by the data receiving device, and wherein the data attribute comprises at least one of a data format, data precision, or a data bit width; and wherein the data specification requirement of the data analysis device comprises data precision of a service requirement.

6. The method according to claim 3, wherein the method further comprises:

sending, to the controller, the collection frequency or a collection periodicity representing the collection interval.

7. The method according to claim 6, wherein the sending, to the controller, the collection periodicity or the collection frequency representing the collection interval comprises:

sending, to the controller, based on a collection interval for the target indicator changing, the collection periodicity or the collection frequency representing the collection interval.

8. The method according to claim 1, wherein the determining, by the data collection device based on the threshold corresponding to the target indicator, the collection interval for the to-be-collected data of the target indicator comprises:

determining the collection interval based on a value relationship between collected data of the target indicator and the threshold.

9. A data collection method, comprising:

determining a data collection policy of a target indicator, wherein the data collection policy comprises collection interval indication information, the collection interval indication information is one of a plurality of collection frequencies or a plurality of collection periodicities, and the plurality of collection frequencies or the plurality of collection periodicities represent a plurality of available collection intervals for collecting data of the target indicator; and sending the data collection policy to a data collection device;

wherein the determining a data collection policy of a target indicator comprises:

obtaining at least one of capability information of the data collection device, a data specification requirement of a data analysis device, or capability information of a data receiving device;

determining the data collection policy based on the at least one of the capability information of the data collection device, the data specification requirement, or the capability information of the data receiving device;

determining a resource occupation status and an evaluation result of a service requirement satisfaction degree based on the data of the target indicator, wherein the evaluation result of the service requirement satisfaction degree represents whether collected data of the target indicator satisfies a service requirement;

determining data amount adjustment indication information based on the resource occupation status and the evaluation result of the service requirement satisfaction degree; and sending the data amount adjustment indication information to the data collection device.

10. The method according to claim 9, wherein the obtaining at least one of the capability information of the data collection device, the data specification requirement of the data analysis device, or the capability information of the data receiving device comprises at least one of:

receiving the capability information of the data collection device from the data collection device;

receiving the capability information of the data receiving device from the data receiving device; or receiving the data specification requirement from the data analysis device.

11. The method according to claim 9, wherein the data collection policy further comprises a threshold corresponding to the target indicator, and wherein a collection interval for the data of the target indicator is determined based on the threshold corresponding to the target indicator.

12. The method according to claim 9, wherein the capability information of the data collection device indicates at least one of a data attribute supported by the data collection device, a capability of the data collection device to determine a collection interval for data of an indicator based on a threshold of the indicator, a collection frequency supported by the data collection device, or a collection periodicity supported by the data collection device, and wherein the data attribute comprises at least one of a data format, data precision, or a data bit width;

wherein the capability information of the data receiving device indicates at least one of a data attribute supported by the data receiving device, a data reporting frequency supported by the data receiving device, or a data reporting periodicity supported by the data receiving device; and wherein the data specification requirement of the data analysis device comprises data precision of a service requirement.

13. The method according to claim 9, wherein the resource occupation status comprises at least one of a network-bandwidth occupation status or a storage-space occupation status of the data receiving device, and wherein the service requirement satisfaction degree represents whether currently collected data satisfies the service requirement; and wherein the data amount adjustment indication information indicates to increase or decrease a data collection amount.

14. A data collection device, wherein the device comprises:

at least one processor; and a non-transitory computer-readable storage medium storing a program to be executed by the processor, the program including instructions to:

determine, based on a threshold corresponding to a target indicator, a collection interval for to-be-collected data of the target indicator from a plurality of available collection intervals; and collect the data of the target indicator based on the collection interval;

wherein the threshold is adjusted based on a data characteristic; and wherein the data characteristic comprises at least one of a data physical characteristic, a data distribution feature, or a data collection result evaluation, wherein the data collection result evaluation represents a degree of impact, on performance of the data collection device, of collecting the data of the target indicator by the data collection device based on a current collection frequency, and wherein the data physical characteristic indicates a change speed of data of the target indicator.

15. The device according to claim 14, wherein the instructions further include instructions to:

adjust at least one of the plurality of available collection intervals based on the data characteristic.

16. The device according to claim 14, wherein the instructions further include instructions to:

receive a data collection policy from a controller, wherein the data collection policy comprises at least one of the threshold or collection interval indication information, wherein the collection interval indication information is a plurality of collection frequencies or the collection interval indication information is a plurality of collection periodicities, and wherein the plurality of collection frequencies or the plurality of collection periodicities represent the plurality of available collection intervals; or wherein the instructions further include instructions to:

obtain receive-end capability information, wherein the receive-end capability information is generated based on at least one of capability information of a data receiving device or a data specification requirement of a data analysis device; and determine the data collection policy based on the receive-end capability information, wherein the data collection policy comprises collection interval indication information, wherein the collection interval indication information is a plurality of collection frequencies or a plurality of collection periodicities, and wherein the plurality of collection frequencies or the plurality of collection periodicities represent the plurality of available collection intervals.

17. The device according to claim 16, wherein the instructions further include instructions to:

send capability information of the data collection device to the controller, wherein the capability information of the data collection device indicates at least one of a data attribute supported by the data collection device, a capability of the data collection device to determine a collection interval for data of an indicator based on a threshold of the indicator, a collection frequency supported by the data collection device, or a collection periodicity supported by the data collection device, and wherein the data attribute comprises at least one of a data format, data precision, or a data bit width, wherein the controller determines the data collection policy based on the capability information of the data collection device.

18. The device according to claim 16, wherein the capability information of the data receiving device indicates at least one of a data attribute supported by the data receiving device, a data reporting frequency supported by the data receiving device, or a data reporting periodicity supported by the data receiving device, and wherein the data attribute comprises at least one of a data format, data precision, or a data bit width; and the data specification requirement of the data analysis device comprises data precision of a service requirement.

19. The device according to claim 16, wherein the instructions further include instructions to:

send, to the controller, a collection frequency or a collection periodicity representing the collection interval.

20. A controller, wherein the controller comprises:

at least one processor; and a non-transitory computer-readable storage medium storing a program to be executed by the processor, the program including instructions to:

obtain at least one of capability information of a data collection device, a data specification requirement of a data analysis device, or capability information of a data receiving device;

determine a data collection policy based on the at least one of the capability information of the data collection device, the data specification requirement, or the capability information of the data receiving device, wherein the data collection policy comprises collection interval indication information, the collection interval indication information is a plurality of collection frequencies or a plurality of collection periodicities, and the plurality of collection frequencies or the plurality of collection periodicities represent a plurality of available collection intervals for collecting data of a target indicator;

send the data collection policy to the data collection device;
determine a resource occupation status and an evaluation result of a service requirement satisfaction degree based on the data of the target indicator, wherein the evaluation result of the service requirement satisfaction degree represents whether collected data of the target indicator satisfies a service requirement;
determine data amount adjustment indication information based on the resource occupation status and the evaluation result of the service requirement satisfaction degree; and
send the data amount adjustment indication information to the data collection device.

* * * * *